United States Patent [19]
Sawabe et al.

[11] Patent Number: 5,966,352
[45] Date of Patent: Oct. 12, 1999

[54] INFORMATION RECORDING MEDIUM WITH INTERLEAVED DATA, APPARATUS FOR RECORDING SAME AND APPARATUS FOR REPRODUCING SAME

[75] Inventors: Takao Sawabe, Tokyo-to; Ryuichiro Yoshimura; Junichi Yoshio, both of Tokorozawa; Akihiro Tozaki, Tsurugashima; Yoshiaki Moriyama, Tsurugashima; Kaoru Yamamoto, Tsurugashima, all of Japan

[73] Assignee: Pioneer Electronic Corporation, Tokyo-to, Japan

[21] Appl. No.: 08/820,256

[22] Filed: Mar. 18, 1997

[30] Foreign Application Priority Data

Mar. 19, 1996 [JP] Japan .................... 8-063590

[51] Int. Cl.⁶ .................... G11B 17/22; G11B 5/09
[52] U.S. Cl. .................... 369/32; 369/48; 369/275.3
[58] Field of Search .................... 369/32, 33, 47, 369/48, 49, 54, 58, 275.3, 83; 360/13

[56] References Cited

U.S. PATENT DOCUMENTS 5,613,112  3/1997  Nagashima .................... 369/32 X

*Primary Examiner*—Paul W. Huber
*Attorney, Agent, or Firm*—Morgan, Lewis & Bockius LLP

[57] ABSTRACT

An information recording medium includes a plurality of first information pieces each of which is reproduced successively in time by a reproducing apparatus; a plurality of second information pieces each of which is successively positioned on the information recording medium, one or more of the second information piece constituting the first information piece; a plurality of third information pieces each of which is individually reproducible and is a unit for jump reproduction by the reproducing apparatus, one or more of the third information piece constituting the second information pieces; at least one related information piece included in the third information piece and relating to a reproduction order and a reproduction method of the second information pieces; at least one reproduction control information piece referred to by the reproducing apparatus and relating to a reproduction order and a reproduction method of the first information pieces. At least one of the related information piece and the reproduction control information piece includes a jump reproduction method selection information piece indicating one of a plurality of jump reproduction methods performed by the reproducing apparatus.

20 Claims, 21 Drawing Sheets

PHYSICAL STRUCTRE OF RECORD INFORMATION
(PHYSICAL FORMAT)

STRUCTURE OF INTERLEAVED UNIT

IU : INTERLEAVED UNIT

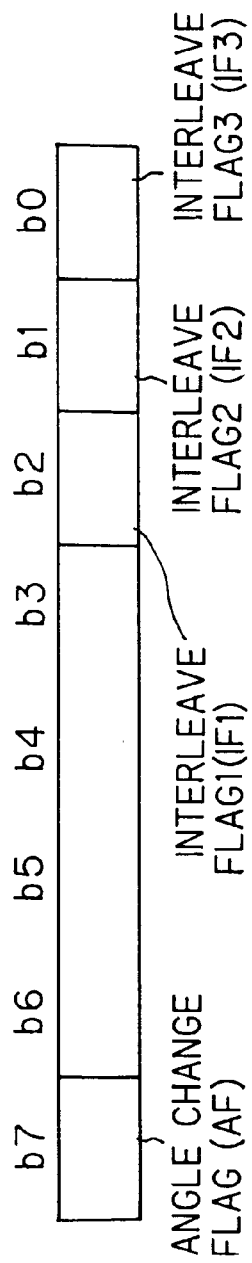

FIG. 5

INTERLEAVE FLAG IF1
 0: CELL IS IN VOB NOT CONSTITUTING INTERLEAVED UNIT
 1: CELL IS IN VOB CONSTITUTING INTERLEAVED UNIT

INTERLEAVE FLAG IF2
 0: HEAD OF CELL NOT COINCIDE HEAD OF INTERLEAVED UNIT
 1: HEAD OF CELL COINCIDE HEAD OF INTERLEAVED UNIT

INTERLEAVE FLAG IF3
 0: HEAD OF CELL IS NOT IMMEDIATELY PRIOR TO VOB CONSTITUTING INTERLEAVED UNIT
 1: HEAD OF CELL IS IMMEDIATELY PRIOR TO VOB CONSTITUTING INTERLEAVED UNIT

ANGLE CHANGE FLAG AF
 0: NON-SEAMLESS REPRODUCTION
 1: SEAMLESS REPRODUCTION

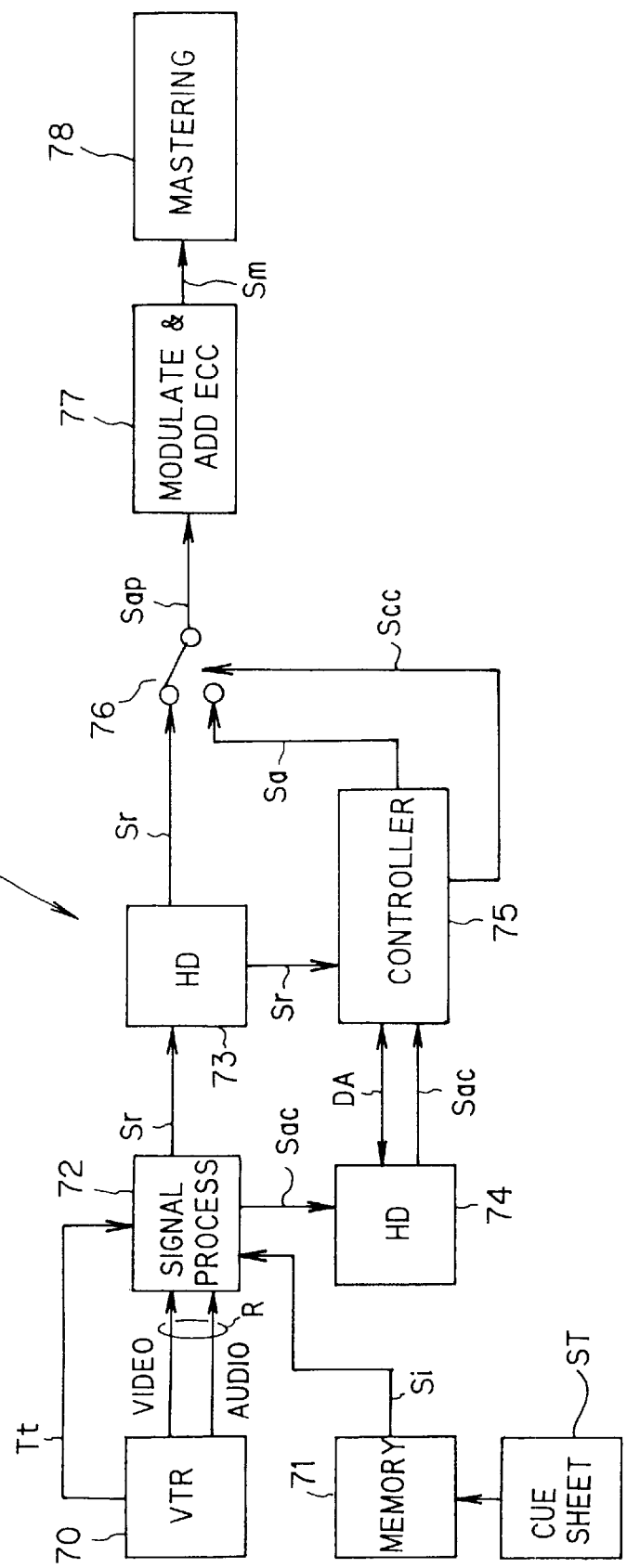

INFORMATION RECORDING MEDIUM WITH INTERLEAVED DATA, APPARATUS FOR RECORDING SAME AND APPARATUS FOR REPRODUCING SAME

BACKGROUND OF THE INVENTION

1. Field of the Invention

The present invention relates to an information recording medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information recording medium, and a reproducing apparatus for reproducing the information from the information recording medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, there is a problem that, according to the above mentioned LD or the like, a so-called interactive and variegated reproduction is not possible in which the audience can have a plurality of selection branches as for the video or audio information to be displayed or sound-outputted and in which the audience can select them to watch or listen to it.

Namely, it is impossible for a user to choose the language used in the subtitle displayed on the screen (e.g., from subtitle of Japanese and the original language) in the case of watching a foreign movie recorded on a LD or to choose the voices of a song (e.g., fromEnglish voices or Japanese Voices) in the case of listening to the music recorded on a CD.

Nowadays, apart from the above-mentioned conventional CD, it has been proposed and developed a DVD which is an optical disc which disc size is identical to CD and which recording capacity is enhanced to be approximately ten times larger than that of CD. In DVD, there is a problem as to how a special reproduction, such as a search reproduction and/or a jump reproduction, for reproducing a desired position of a user is performed. Particularly, in the case of the recording medium, such as DVD, on which a plurality of information pieces are independently recorded, it is impossible to apply the technique of the special reproduction, i.e., search reproduction and/or jump reproduction, as used in the recording medium, such as a LD, on which information is successively and continuously recorded.

SUMMARY OF THE INVENTION

It is therefore an object of the present invention to provide an information recording medium, an apparatus for recording the same, and an apparatus for reproducing the same, which can smoothly perform a special reproduction, such as search and/or jump reproduction.

According to one aspect of the present invention, there is provided an information recording medium reproduced by an information reproducing apparatus including: a reproduction unit; a reproduction control unit; and a jump reproduction unit for allowing the reproduction unit to jump to a jump target position and to continue reproduction in response to an instruction from a user, the recording medium including: a plurality of first information pieces each of which is reproduced successively in time by the reproduction unit; a plurality of second information pieces each of which is successively positioned on the information recording medium, one or more of the second information piece constituting the first information piece; a plurality of third information pieces each of which is individually reproducible and is a unit for jump reproduction by the jump reproduction unit, one or more of the third information piece constituting the second information pieces; at least one related information piece included in the third information piece and relating to a reproduction order and a reproduction method of the second information pieces; at least one reproduction control information piece referred to by the reproduction unit and relating to a reproduction order and a reproduction method of the first information pieces, wherein at least one of the related information piece and the reproduction control information piece includes a jump reproduction method selection information piece indicating one of a plurality of jump reproduction methods performed by the jump reproduction unit.

In accordance with the recording medium thus configured, the first information pieces and the second information pieces are reproduced according to the reproduction control information piece and the related information pieces. When the jump reproduction is instructed by a user, the reproduction is appropriately performed on the basis of the jump reproduction method specified by the jump reproduction method selection information pieces.

The medium may be so configured that the plurality of first information pieces include a plurality of selectible information pieces, one of the selectible information pieces being reproduced selectively at a reproduction time period in the reproduction order. By this, the plurality of selectible information pieces are reproduced according to the selection by the user.

The medium may be so configured that the jump reproduction method selection information piece is determined in accordance with the jump target position in the jump reproduction. By this, the jump reproduction is performed in best method according to the jump target position.

The medium may be so configured that the jump reproduction method selection information piece is determined in accordance with the jump reproduction method of the plurality of selectible information pieces. By this, the jump reproduction is performed in best method according to the reproduction method of the selectible information pieces.

According to another aspect of the present invention, there is provided an information reproducing apparatus for reproducing information from an information recording medium including: a plurality of first information pieces each of which is reproduced successively; a plurality of second information pieces each of which is successively positioned on the information recording medium, one or more of the second information piece constituting the first information piece; a plurality of third information pieces each of which is individually reproducible and is a unit for jump reproduction, one or more of the third information piece constituting the second information pieces; at least one related information piece included in the third information piece and relating to a reproduction order and a reproduction method of the second information pieces; at least one reproduction control information piece relating to a reproduction order and a reproduction method of the first information pieces; and a jump reproduction method selection information piece indicating one of a plurality of jump reproduction methods, the apparatus including: a reproduction unit for successively reproducing the second information piece to reproduce the first information pieces by referring to the related information piece; a reproduction control unit for controlling the reproduction of the first information pieces by the reproduction unit by referring to the reproduction control information piece; and a jump reproduction unit for allowing the reproduction unit to jump to a jump target position to reproduce the third information piece in response to an instruction from a user, wherein the jump reproduction unit controls the reproduction unit in accordance with the jump reproduction method specified by the jump reproduction method selection information piece.

In accordance with the apparatus thus configured, the reproduction unit successively reproduces the second information piece to reproduce the first information pieces by referring to the related information piece. The reproduction control unit controls the reproduction of the first information pieces by the reproduction unit by referring to the reproduction control information piece. The jump reproduction unit allows the reproduction unit to jump to a jump target position to reproduce the third information piece in response to an instruction from a user. The jump reproduction unit controls the reproduction unit in accordance with the jump reproduction method specified by the jump reproduction method selection information piece.

The apparatus may be so configured that the jump reproduction unit controls the reproducing unit by one of a first method in which the reproducing unit reproduces the information pieces in a seamless manner and a second method in which the reproducing unit reproduces the information pieces in a non-seamless manner.

Further, the apparatus may be so configured that the reproducing unit including: a reading unit for reading the information pieces; a storing unit for storing data read by the reading unit; and an outputting unit for outputting data stored in the storing unit, wherein the outputting unit starts outputting the data immediately after the jump of the reproducing unit to the jump target position in the first method and starts outputting the data when the storing unit becomes full after the jump of the reproducing unit in the second method.

According to still another aspect of the present invention, there is provided an information recording apparatus including: a first unit for dividing an information having a continuous contents into a plurality of third information pieces each of which is reproducible independently; a second unit for producing at least one related information piece related to a reproduction order and a reproduction method of second information pieces each of which is constituted by one or more of the third information piece; a third unit for producing at least one control information piece relating to a reproduction order and a reproduction method of first information pieces each of which is constituted by one or more of the second information piece; a fourth unit for producing at least one jump reproduction method selection information piece indicating one of a plurality of jump reproduction methods; and a recording unit for recording the third information pieces, the related information pieces, the reproduction control information pieces and the jump reproduction method selection information pieces on an information recording medium.

In accordance with the recording apparatus thus configured, the first unit divides an information having a continuous contents into a plurality of third information pieces each of which is reproducible independently, and the second unit produces at least one related information piece related to a reproduction order and a reproduction method of second information pieces each of which is constituted by one or more of the third information piece. The third unit produces at least one control information piece relating to a reproduction order and a reproduction method of first information pieces each of which is constituted by one or more of the second information piece. The fourth unit produces at least one jump reproduction method selection information piece indicating one of a plurality of jump reproduction methods. Then, the recording unit records the third information pieces, the related information pieces, the reproduction control information pieces and the jump reproduction method selection information pieces on an information recording medium.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 5 is a diagram illustrating a recording manner of interleave flags and angle change flags on the DVD;

FIG. 6 is a block diagram of an information recording apparatus for recording the DVD in FIG. 1, according to the present invention;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

First information piece: Cell

Second information piece: Interleaved unit

Third information piece: VOB unit

Related information piece: DSI packet in navi-pack

Reproduction control information piece:
  PGCI (ProGram Chain Information)
  Jump reproduction method selection information piece:
    Interleave information, Angle information

[I] Embodiment of Information Record Medium

First of all, a physical structure and a logical structure as well as an operation of a DVD, as one embodiment of the information recording medium to which the present invention is applied, will be explained with reference to FIG. 1.

Figure 1:
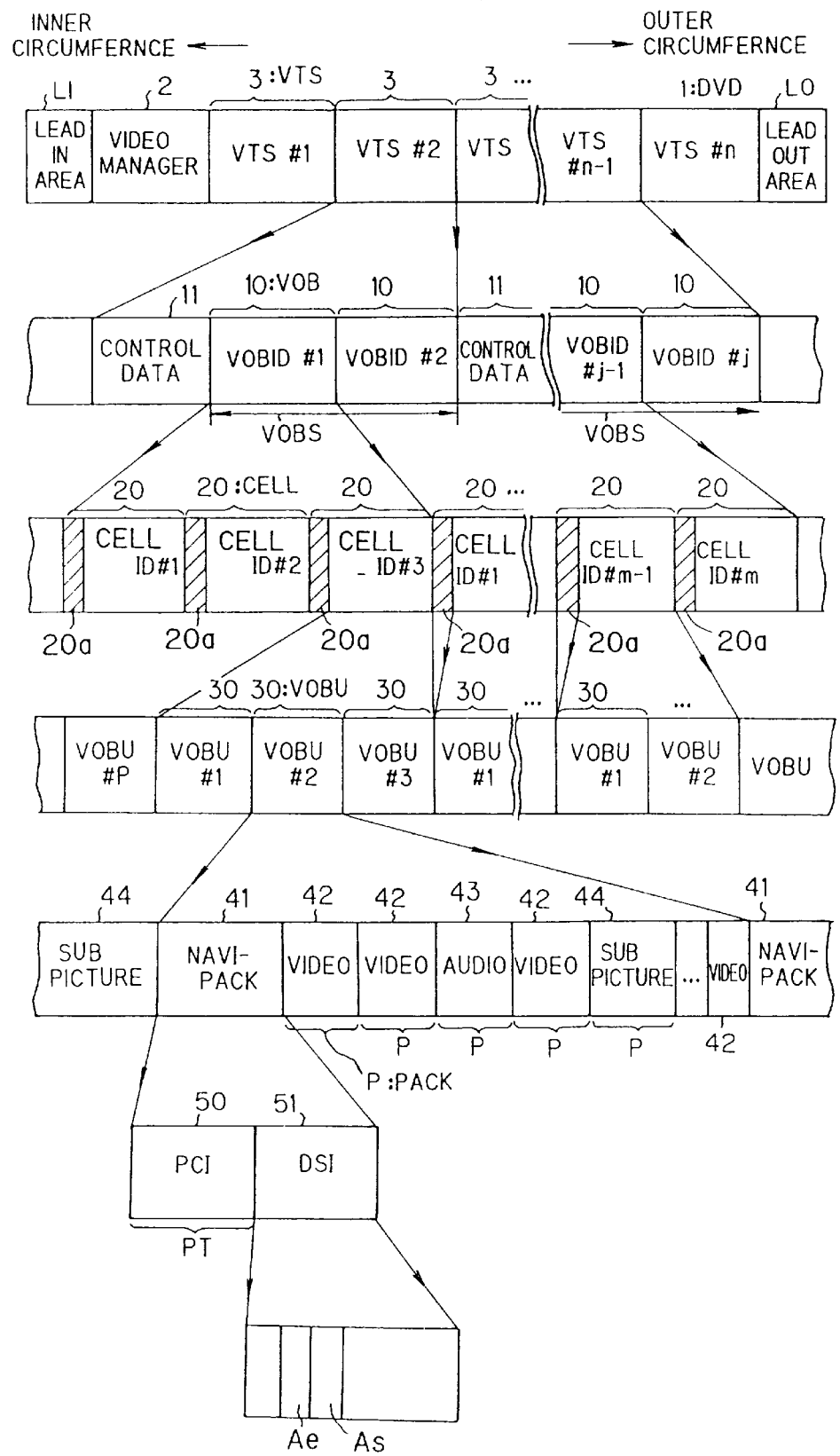
FIG. 1 is a diagram showing a physical structure of record information of a DVD as one embodiment of the present invention.

At first, a record format of video information and audio information on the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for accessing each title, information for preventing an illegal copy, an access table for directly accessing each title and so on, is recorded.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes the video information, the audio information and sub picture information (which is defined as information of a sub picture such as a subtitle of a movie etc.). Each cell includes a cell table 20a which prescribes a control information relating the reproduction of cell 20.

One VOB unit 30 is provided with: a navi-pack (a navigation pack) 41 for the control information; a video pack 42 for the video information; an audio pack 43 for the audio information; and a sub picture pack 44 for the sub picture information. Here, in the video pack 42, a packet including the video data is recorded. In the audio pack 43, a packet including the audio data is recorded. Further, in the sub picture pack 44, a packet including graphics such as a character and a diagram as the sub picture, is recorded. In the video packs 42, which data amount is relatively large as shown in FIG. 1, one or a plurality of GOPs are recorded within one VOB unit 30. The audio pack 43 and the sub picture pack 44 are disposed intermittently between the video packs 42. It is prescribed by a standard specification of the DVD that there are 8 kinds of audio recordable on the DVD 1 while 32 kinds of sub picture recordable on the DVD 1.

Further, there always exists the navi-pack 41 in one VOBU 30. On the other hand, there may not exist each of the video pack 42, the audio pack 43 and the sub picture pack 44 in one VOBU 30, or, even in case that these packs exist in one VOBU 30, the number of the packs and the order of the packs are freely determined.

Finally, the navi-pack 41 is provided with: a DSI (Data Search Information) packet 51 including search information to search a video image or an audio sound desired to be displayed or sound-outputted (concretely, search information such as an address, where the video or audio to be displayed or sound-outputted is recorded, on the DVD 1); and a PCI (Presentation Control Information) packet 50 including information related to a display control at a time of displaying the video image or outputting the audio sound, which is searched on the basis of the information of the DSI packet 51. Further, all video data included in one VOBU 30 consist of at least one GOP (Group Of Pictures). In the PCI packet 50, high light information, which defines a display or operation at a time when one selection item is selected out of selection items by the audience, is included. By the high light information, for example, the change of the picture plane display as well as the display position to be changed with respect to the selection item selected on a special picture plane of selection items (i.e. a so-called menu picture plane) for the audience to select, and the command corresponding to the selected item (i.e. a command to be performed in correspondence with the selected item) are set.

The video information to construct and display a frame, a selection button and the like, which is required to construct and display the menu picture plane, is recorded in the sub picture pack 44 as the sub picture information.

Further, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Figure 2:
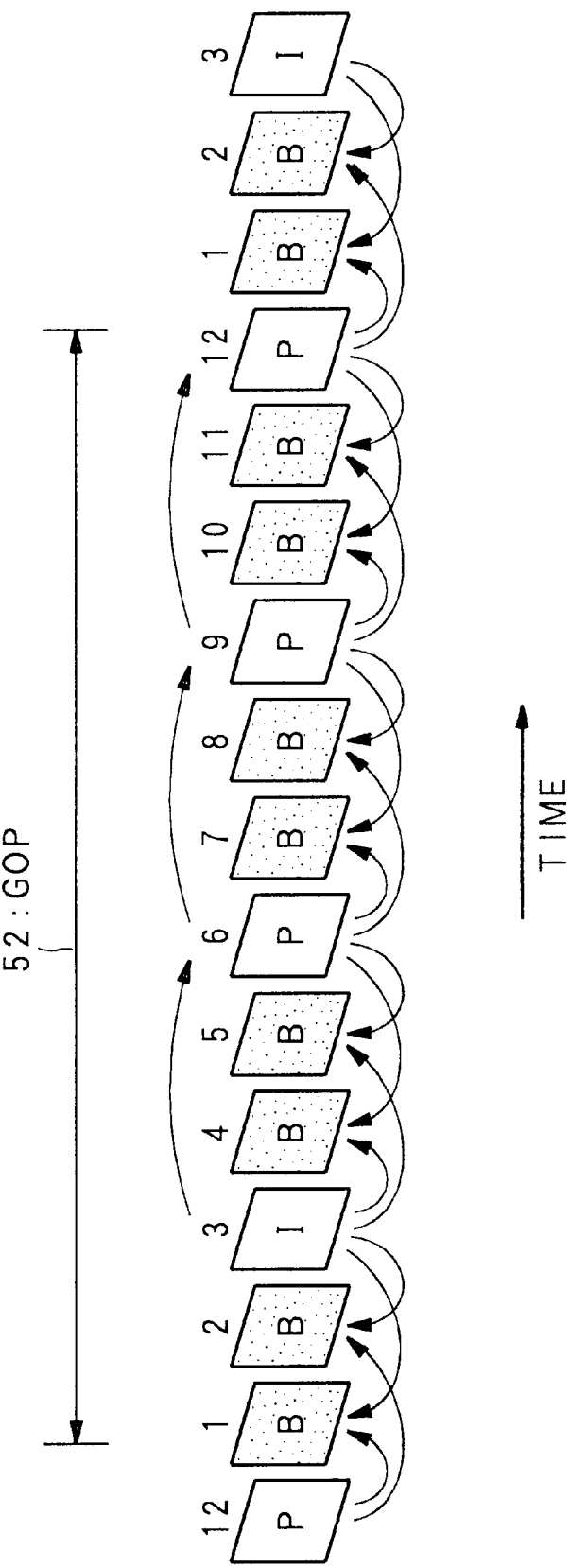
FIG. 2 is a diagram showing frame pictures constructing a GOP.

Further, the scheme of the above explained GOP is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign "I" is called as an I picture (Intra-coded picture), which is defined as a frame picture able to be reproduced as a complete frame picture by use of its own picture information. A frame picture indicated by a reference sign "P" is called as a P picture (Predictive-coded picture), which is defined as a frame picture predicted or generated by decoding a difference from a predictive picture compensated and reproduced on the basis of the already decoded I picture or other picture. A frame picture indicated by a reference sign "B" is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 3. The information is not actually recorded on the DVD 1 in the logical structure of FIG. 3. Instead, information (e.g. access information or time information) to reproduce each data shown in FIG. 1 by combining them (especially combining the cells 20) in the logical structure shown in FIG. 3, is recorded on the DVD 1, especially in the control data 11.

Figure 3:
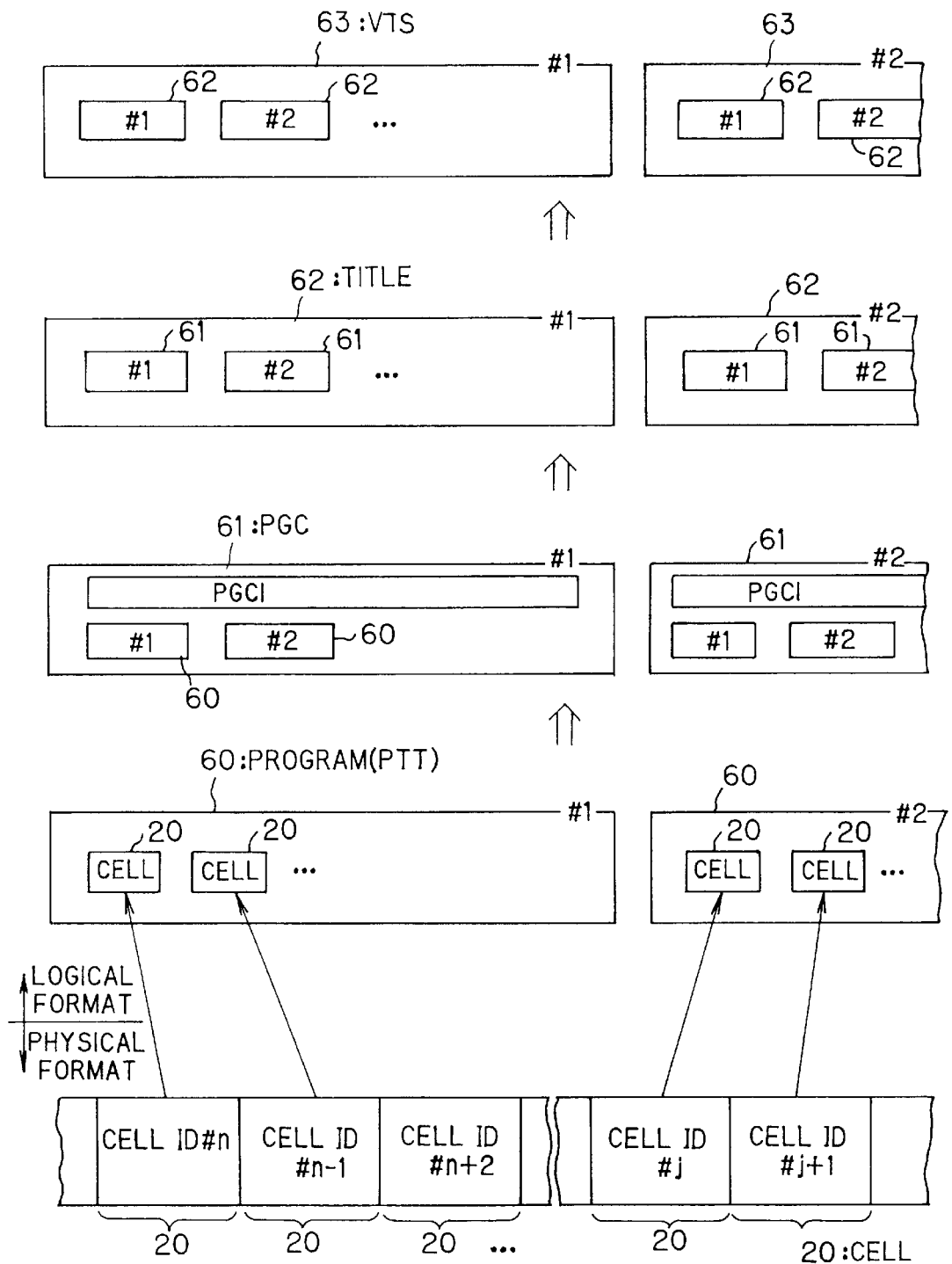
FIG. 3 is a diagram showing a logical structure of the record information of the DVD in FIG. 1.

To make the explanation clear, the following explanation is made from the lower hierarchical layer in FIG. 3. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT Of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 3, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 2. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 3. The title 62 included in the VTS 63 has the attributes common to each other. For example, the movies based on one movie but in different languages correspond to the respective titles 62. The information included in one VTS 63 shown in FIG. 3 corresponds to information included in one VTS 3 shown in FIG. 1. Namely, all information included in the logical VTS 63 shown in FIG. 2 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 maybe divided into a plurality of interleaved units IU to be actually recorded on the DVD 1, as shown in FIG. 4.

Figure 4:
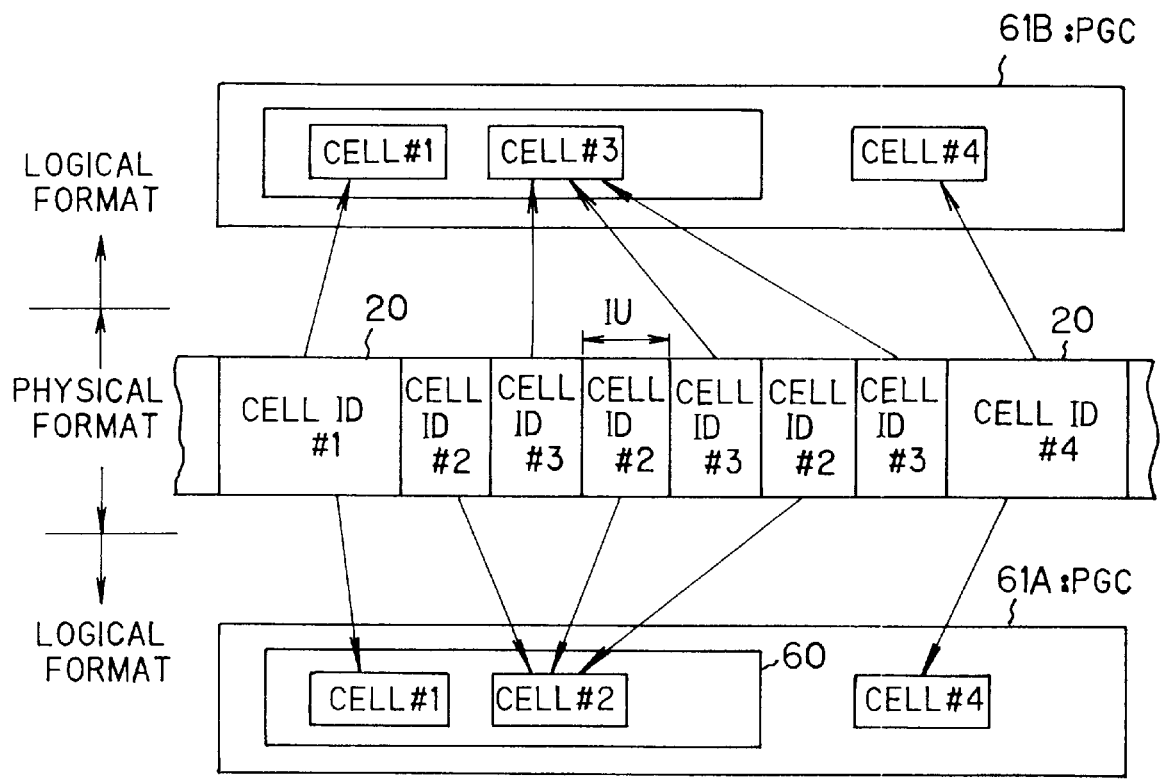
FIG. 4 is a diagram showing a structure of an interleaved unit of the DVD in FIG. 1.

Namely, as shown in FIG. 4, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 4, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at the track buffer (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU. The reproduction technique of the interleaved units IU is a characteristic feature of the present invention, and hence the more detailed description will be made later.

Since a DVD has a recording capacity large enough to record information of not only a movie itself but also the sounds and/or subtitles of the movie in many languages together on a single optical disk, the aforementioned recording format may be advantageously applied to DVD.

Next, out of the information having the above described physical and logical structure, the description will be particularly given of interleave information and angle change information. In the present invention, the interleave information and the angle change information are recorded in the cell table 20a in cell 20. FIG. 5 shows the manner of recording the interleave information and the angle change information in the cell table 20a. As shown, the interleave information is recorded in the form of interleave flags IF1–IF3. The interleave flag IF1 indicates whether or not the cell 20 including the cell table 20a belongs to the VOB 10 which constitutes the interleaved unit IU. The interleave flag IF1 becomes "1", if the cell 20 belongs to the VOB 10 which constitutes the interleaved unit IU and becomes "0" if the cell 02 belongs to the VOB 10 which does not constitute the interleaved unit IU. The interleave flag IF2 indicates whether or not the head of the cell 20 including the cell table 20a is coincident with the head of the interleaved unit IU. The interleave flag IF2 becomes "1" if they coincide and becomes "0" if they do not coincide. The interleave flag IF3 indicates whether or not the head of the cell 20 is positioned immediately prior to the VOB 10 which constitutes the interleaved unit IU. The interleave flag IF3 becomes "1" if the head of cell 20 is positioned immediately prior to the VOB 10 constituting the interleaved unit IU and becomes "0" if it is not. Here, if the time length from the head of the cell 20 to the next VOB 10 is substantially equal to the reproduction time of a minimum interleaved unit and the reproduction enters the interleaved unit immediately after the reproduction of the time length of the minimum interleaved unit, it is deemed that the cell 20 locates immediately prior to the VOB 10 constituting the interleaved unit.

Further, in the cell table 20a, the angle change flag AF used for the angle reproduction is recorded as the angle change information. The angle reproduction is such that plural pictures of a unique scene taken from a plurality of angles are recorded, and one of them selected by a user is reproduced. The detail of the angle reproduction will be described later. The angle change flag AF prescribes, as the reproduction method at the time of the angle change instructed by a user, whether the angle is switched with the seamless reproduction being ensured although the switching requires a certain time delay, or the angle is quickly switched although the reproduction becomes non-seamless. Specifically, if the angle flag AF is "1", the angle change is performed in a seamless manner although it takes some time. If the angle change flag AF is "0", the angle change is made immediately after the instruction thereof by the user although the reproduction becomes non-seamless.

The interleave information and the angle change information described above are referred to at the time of search reproduction and the jump reproduction described later, and the reproduction apparatus performs an appropriate reproduction control on the basis of the contents of those information.

In the above description, the interleave information is recorded in the cell table 20a in the cell 20. However, the interleave information may be recorded in the DSI packet 51 in the navi-pack 41 within each VOBU 30 (see. FIG. 1). In such a case, the interleave information is recorded, not by the unit of the cell 20, but by the unit of VOBU 30 constituting the cell 20. Also in this case, the interleave information is referred to at the time of search reproduction, and the reproduction is performed on the basis of the contents of the interleave information. Since the interleave information is described and set by a very small unit, it is advantageous for the search of an arbitrary time, for example.

[II] Embodiment of Recording Apparatus

Next, an embodiment of recording apparatus for recording the above mentioned control information, video information and audio information onto the DVD 1 will be explained with reference to FIG. 6.

At first, a construction and an operation of the recording apparatus as the embodiment is explained with reference to FIG. 6.

As shown in FIG. 6, a recording apparatus S1 as the present embodiment is provided with: a VTR (Video Tape Recorder) 70; a memory 71; a signal process unit 71; a hard disk (HD) device 73; a hard disk (HD) device 74 a controller 75; a multiplexer 76; a modulator 77; and a mastering device 78.

Nextly, an operation of the present embodiment is explained.

Record information R, which is a raw material such as audio information, video information etc. to be recorded on the DVD 1, is temporarily recorded in the VTR 70. Then, the record information R temporarily record in the VTR 70 is outputted to the signal process unit 72 by a request from the signal process unit 72.

The signal process unit 72 applies an A/D (Analog to Digital) converting process and a signal compressing process to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into a plurality of partial record information Pr in advance, and temporarily stores content information related to the partial record information Pr which is inputted beforehand on the basis of a cue sheet ST, on which reproduction control information are written. Then, the memory 71 outputs it as a content information signal Si on the basis of a request from the signal process unit 72. Here, the reproduction control information is information prescribing how to combine and arrange the above record information R, based on the conception of the author, to constitute the title, and includes the PGCI to be recorded in the control data 11 and the various information to be recorded in the video manager 2. The aforementioned interleave information and angle change information are included in the reproduction control information.

Then, the signal process unit 72 generates and outputs an access information signal Sac corresponding to the partial record information Pr with referring to a time code Tt, on the basis of the time code Tt corresponding to the record information R outputted from the VTR 70 and the content information signal Si outputted from the memory 71. Then, the access information signal Sac is temporarily stored in the hard disk device 74. The above described processes are performed with respect to the whole record information R.

When the above described processes are finished as for the whole record information R, the controller 75 reads out the compressed multiplexed signal Sr from the hard disk device 73, reads out the access information signal Sac from the hard disk device 74, generates additional information DA on the basis of these read out signals, and stores the additional information DA into the hard disk device 74. This is because there may be a control signal, which content is determined in dependence upon a generation result of the compressed multiplexed signal Sr among various control signals. Here, the reproduction control information including the interleave information and the angle change information are included in the additional information DA. On the other hand, the controller 75 performs a time management for each of the operations of the signal process unit 72, the hard disk device 73 and the hard disk device 74, and reads out the additional information DA from the hard disk device 74, so that the controller 75 generates and outputs an additional information signal Sa corresponding to the read-out additional information DA, and generates and outputs an information selection signal Scc to time-axis-multiplex the compressed multiplexed signal Sr and the additional information signal Sa.

After that, the compressed multiplexed signal Sr and the additional information signal Sa are time-axis-multiplexed by the multiplexer 76 to be outputted as an information added compressed multiplexed signal Sap.

Then, the modulator 77 adds an error correction code (ECC), such as a Reed Solomon code, and applies a modulation such as an eight to sixteen (8–16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

In the manner described above, the reproduction control information, including the interleave information and the angle change information, is recorded on the DVD 1 according to the aforementioned physical structure.

[III] Embodiment of Reproducing Apparatus

Next, an embodiment of reproducing apparatus for reproducing the information recorded on the DVD 1 by the above mentioned recording apparatus will be explained with reference to FIGS. 7 to 22.

At first, a construction and an operation of the reproducing apparatus as the embodiment is explained with reference to FIG. 7.

Figure 7:
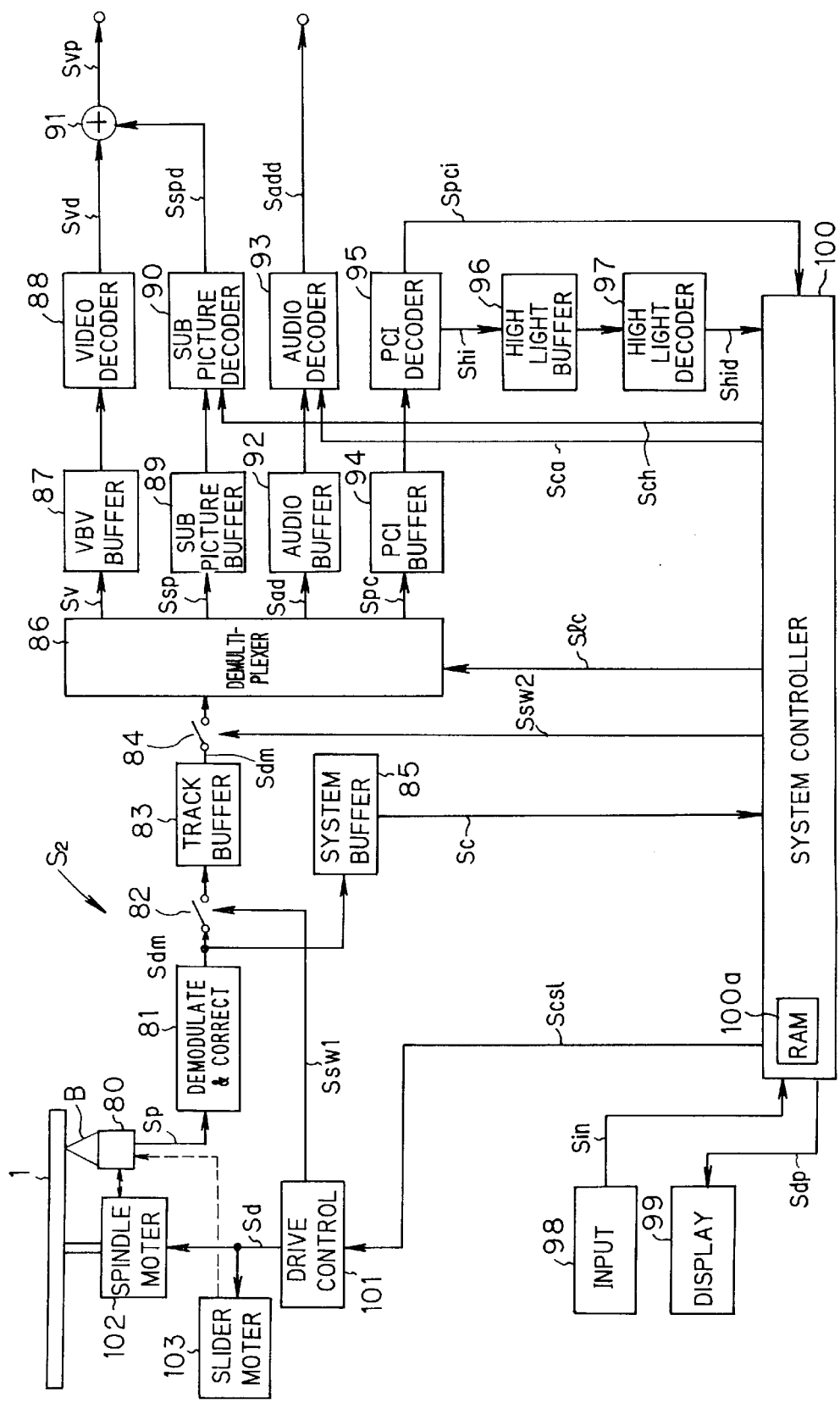
FIG. 7 is a block diagram of an information reproducing apparatus for reproducing the DVD in FIG. 1, as another embodiment of the present invention.

As shown in FIG. 7, a reproducing apparatus S2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 9 only illustrates the portions related to the video and audio reproduction of the reproducing apparatus S2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdmr is inputted, consists of a FIFO (First InFirstOut) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86. Particularly, at the time of reproduction after the search operation and the angle reproduction, in order to perform seamless reproduction, the system controller 100 appropriately opens and closes the stream switches 82 and 84 positioned upstream and downstream of the track buffer 83, respectively, to control the input and output of the track buffer 83. The detail of this operation will be described later.

On the other hand, the system buffer 85, to which the demodulation signal Sdm is inputted in parallel with the track buffer 83, accumulates the video manager 2, the control data 11 of the VTS 3 and the like (refer to FIG. 1) which are detected firstly upon loading the DVD 1 and which are related to the whole information recorded on the DVD 1. Then, the system buffer 85 outputs the accumulated data as a control information Sc to the system controller 100, and temporarily stores the DSI packet 51 for each navi-pack 41 (refer to FIG. 1) as the occasion demands while reproducing the information, to output it also as the control information Sc. In the present invention, the interleave information and the angle information are recorded in the cell table 20*a* of the cell 20. In addition, the interleave information may be recorded in the DSI packet 51 in some occasions. However, in any cases, these information are supplied from the system buffer 85 to the system controller 100 as the control information Sc and are stored in the RAM 100*a*, if necessary.

The demultiplexer 86, to which the demodulation signal Sdm is continuously inputted through the stream switch 84, separates the video information, the audio information, the sub picture information and the PCI packet 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio information or the sub picture information in a plurality of different languages are included as the audio or sub picture information. In that case, a desirable language is selected for the audio or sub picture information by a stream selection signal Slc from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method. Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture information included in the sub picture signal Ssp with the video information corresponding to the sub picture information, and to output it. Then, the sub picture signal Ssp synchronized with the video information is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereat to the audio signal Sad, and it is outputted as a decoded audio signal Sadd to a speaker etc. not illustrated. If it is detected by the system controller 100 that it is necessary to temporarily stop (pause) the audio voice in the reproduction immediately after accessing, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI packet 50, which is included in the PCI signal Spc, with the video information, the audio information and the sub picture information corresponding to the PCI packet 50, and apply the PCI packet 50 to the video information and the like. Then, from the PCI signal Spc, which is synchronized with the corresponding the video information and the like by the PCI buffer 94, a high light information included in the PCI packet 50 is separated or extracted by the PCI decoder 95, and is outputted as a high light signal Shi to the high light buffer 96. The portion of the PCI packet 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. Here, the system controller 100 outputs the aforementioned high light control signal Sch to change the display condition by the high light information, on the basis of the decoded high light signal Shid.

On the basis of the control information Sc inputted from the system buffer 85, the PCI information signal Spci inputted from the PCI decoder 95 and an input signal Sin inputted from the input unit 98 such as a remote controller, the system controller 100 outputs the aforementioned switch signal Ssw2, the language selection signal Slc, the pause signal Sca and the high light control signal Sch to correctly perform the reproduction corresponding to those input signals, and also outputs a display signal Sdp to display an operation condition etc. of the reproducing apparatus S2 to the display unit 99 such as the liquid crystal device.

Further, the system controller 100 outputs a seamless control signal Scsl corresponding to the track jump process, to the drive controller 101, when it detects by the control signal Sc etc. that it is necessary to perform the track jump process such as a search in order to perform the seamless reproduction.

Then, the drive controller 101, to which the seamless control signal Scsl is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 9), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scsl, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

[IV] Special Reproduction

Next, out of the operation of the reproduction apparatus S2, the search reproduction and the angle reproduction, which are the characteristic parts of the present invention, will be described below in more detail.

(1) Reproduction of Multiple Versions

In DVD, it is possible to reproduce multiple contents (versions) of pictures for a unique scene included in a title. Specifically, one of the Japanese version and the English version may be reproduced for a unique movie program, or one of the adult-oriented version and the kids-oriented version for a unique program may be reproduced. In such a case, the DVD 1 is recorded with not only the common pictures used in both the adult-oriented version and the kinds-oriented version but also the exclusive pictures for the adult-oriented version and the kids-oriented version, respectively, in the form of different cells 20. In addition, there are also recorded the reproduction control information for the adult-oriented version and the kinds-oriented version in the control data 11 as different and distinctive PGCs 61. Namely, the PGC 61 for the adult-oriented version prescribes the reproduction order and other control information of the pictures of the common pictures and the adult-oriented version pictures, and the PGC 61 of the kids-oriented version prescribes the reproduction order and other control information of the common pictures and the kids-oriented version pictures. At the time of reproduction, a user instructs the reproducing apparatus the version to be reproduced, and the reproducing apparatus refers to the PGC 61 corresponding to the selected version to reproduce the program.

Figure 8A:
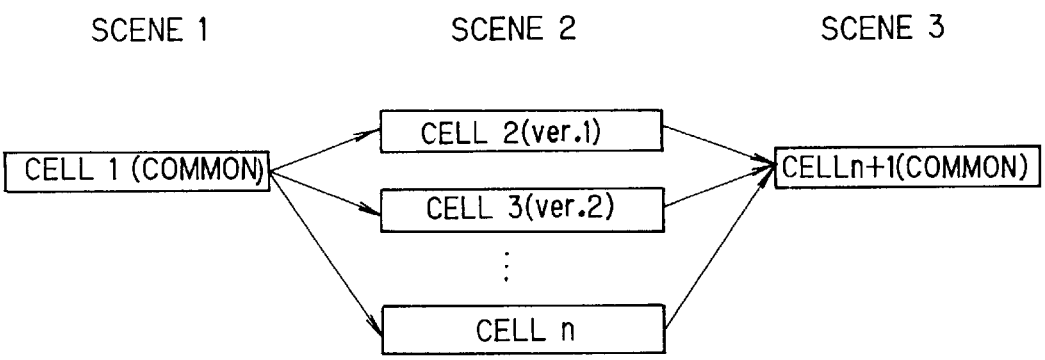
FIGS. 8A and 8B are diagrams illustrating an operation of reproducing a title having multiple versions.
Figure 8B:
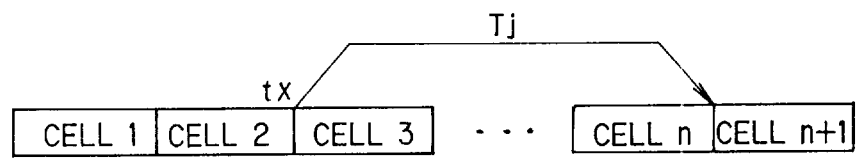

There are many reproduction manners in such cases, and the simplest one of them is illustrated in FIGS. 8A and 8B. In FIG. 8A, it is assumed that there is a movie program including three scenes, scene 1 to scene 3, and multiple versions are prepared for the scene 2. In the case that the user has chosen the version 1, the reproduction goes on in the order of the cell 1, the cell 2, the cell n+1. In the case that the user has chosen the version 2, the reproduction goes on in the order of the cell 1, the cell 3, the cell n+1. The reproduction order of the cells are recorded in the PGC 61 as the reproduction control information corresponding to the respective versions. Here, assuming that the cells 20 are recorded successively as shown in FIG. 1, in reproducing the version 1, the reproducing apparatus S2 reproduces the cell 1 and the cell 2 recorded on the DVD 1 and then jumps to the recording position of the cell n+1 to reproduce it in the manner shown in FIG. 8B. In practice, in response to the user's instruction, the input unit 98 supplies the input signal Sin including the version information indicating the designated version to the system controller 100. The system controller 100, responding to this, refers to the PGC 61 corresponding to the designated version, and supplies the seamless control signal Scsl to the drive controller 101. By this, the pickup 80 reads the cells 20 prescribed by the PGC 61 in the prescribed order, and supplies the read data to the track buffer 83. The track buffer 83 outputs the video signal inputted thereto in the inputted order while accumulating the inputted video signal as the signal Sdm. The video signal is then displayed on a monitor or the like after passing through the VBV buffer 87, the video decoder 88 and so on.

In the case of reproducing the pictures of a certain version seamlessly as shown in FIG. 8B, the pickup 80 jumps to the recording position of the cell n+1 at the time tx after reading the data of the cell 2 to its end, and then starts reading the cell n+1. At this time, the time period needed to jump from the end of the cell 2 to the head of the cell n+1 is defined as a jumping time period Tj. During the jump, the stream switch 82 is kept open and the pickup 80 does not read data, and hence the track buffer 83 continues outputting the data although the data input is absent. Therefore, if the jumping time period Tj is too long, the track buffer 83 outputs all accumulated data without data input and becomes empty (this phenomenon is called as "the underflow of the buffer") As a result, the output data breaks and the seamless reproduction becomes impossible.

Figure 9:
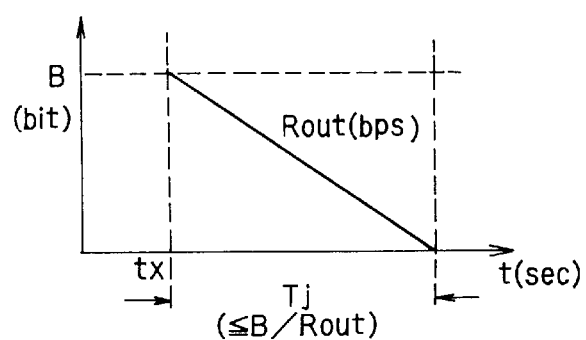
FIG. 9 is a diagram illustrating a transition of data amount in a track buffer shown in FIG. 7.

Now, assuming that the bit rate of the input data to the track buffer 83 is Rin (bps) and the bit rate of the output data from the track buffer 83 is Rout (bps), the input bit rate Rin must be larger than the output bit rate Rout, i.e., Rin>Rout, in order to avoid the data underflow. FIG. 9 shows the transition of the accumulated data amount in the track buffer 83 against time during the jumping time period Tj. In FIG. 9, it is assumed that the track buffer 83 is filled with data (i.e., full of data) just before the track jump, i.e., at time tx, and that the size (capacity) of the track buffer 83 is B. Since the data is not inputted during the jumping time period Tj (i.e., Rin=0), the data amount in the track buffer 83 gradually decreases at the output bit rate Rout as shown in FIG. 9. Accordingly, the following is the condition to reproduce cells 20 seamlessly before and after the track jump:

$Tj \leq (B/Rout)$.

Therefore, the capacity B of the track buffer 83 should satisfy the following condition:

$B \geq Rout \times Tj$.

For example, assuming that the output bit rate Rout is 8 Mbps and the jumping time period Tj is 1 second, the track buffer 83 should have the capacity B larger than 8 Mbits.

Figure 10A:
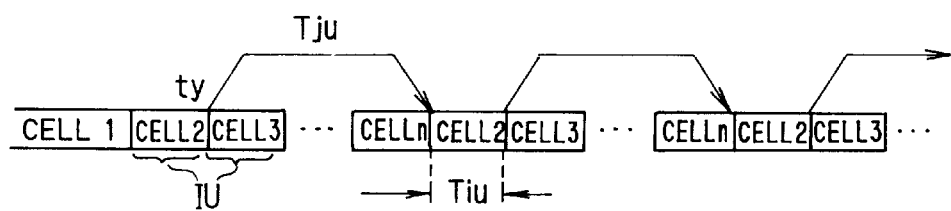
FIGS. 10A and 10B are diagrams illustrating operations of reproducing interleaved units.
Figure 10B:
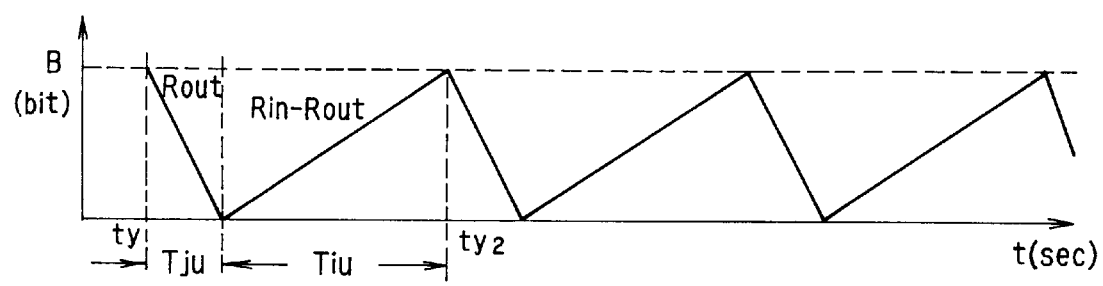

In this view, as shown in FIG. 4, a single cell 20 is divided into multiple interleaved units IU and recorded on the DVD 1. By this, the distance from the jump start position to the jump end position is reduced, as shown in FIG. 10A, to reduce the jumping time period Tju (<Tj), thereby enabling the size (capacity) B of the track buffer 83 to be smaller. FIG. 10B shows the transition of the data amount in the track buffer 83 in such a case. In FIG. 10B, the track jump begins at the time ty and the data in the track buffer 83 gradually decreases at the output bit rate Rout during the jumping time period Tju because no input data is supplied to the track buffer 83. However, by determining the size of the track buffer 83 to satisfy the condition: Tju=B/Rout, the data remains in the track buffer 83 during the track jump. When the track jump is finished, the data in the track buffer 83 starts increasing at the bit rate (Rin−Rout) because the pickup 80 starts reading the data in the cell 20 to which the pickup 80 has jumped. Assuming that the reading time period Tiu for reading the cell is: Tiu=B/(Rin−Rout), for the simplicity's sake, the track buffer 83 becomes full by the time ty2 at which the next track jump begins, and the operation continues in the same way. Therefore, the track buffer 83 does not result in the data underflow. From the above examination, the following is the condition to avoid the underflow of the track buffer 83:

$$Tiu \geq B/(Rin-Rout) \tag{1}$$

and $$Tju \leq B/Rout \tag{2}$$

In the case where Tiu>B/(Rin−Rout), the track buffer 83 becomes full by the end of the reading time period Tiu. In such case, the data input to the track buffer 83 may be temporarily paused and restarted after a certain amount of data has outputted. During the pause of the data input to the track buffer 83, the pickup repeats the track jump operation at the same position in a waiting mode, and starts reading the data from the position just after the position where the data input is paused when the certain amount of data has outputted. By this, the track buffer 83 can output data successively without the overflow. The above operation may be achieved by controlling the drive controller 101 to control the opening and closing of the stream switch 82 and the position of the pickup 80.

Next, the reproduction method of the cells 20 interleaved will be described.

In the DSI packet 51 in the navi-pack 41 which is located at the head of the VOBU 30 in the interleaved unit IU, there are recorded an end address Ae of the interleaved unit IU (hereinafter also referred to simply as "end address Ae") and a start address As of the next interleaved unit IU (hereinafter also referred to simply as "start address As") according to the same version, as the relative positional values from the navi-pack 41. Therefore, by referring to the address information, the seamless reproduction for successively reproducing the interleaved units IU of the same version may be achieved. It is noted that, as the end address Ae and the start address As, special values "0" and "1" are described, respectively, if the VOBU 30 is not included in the interleaved unit IU.

Figure 11:
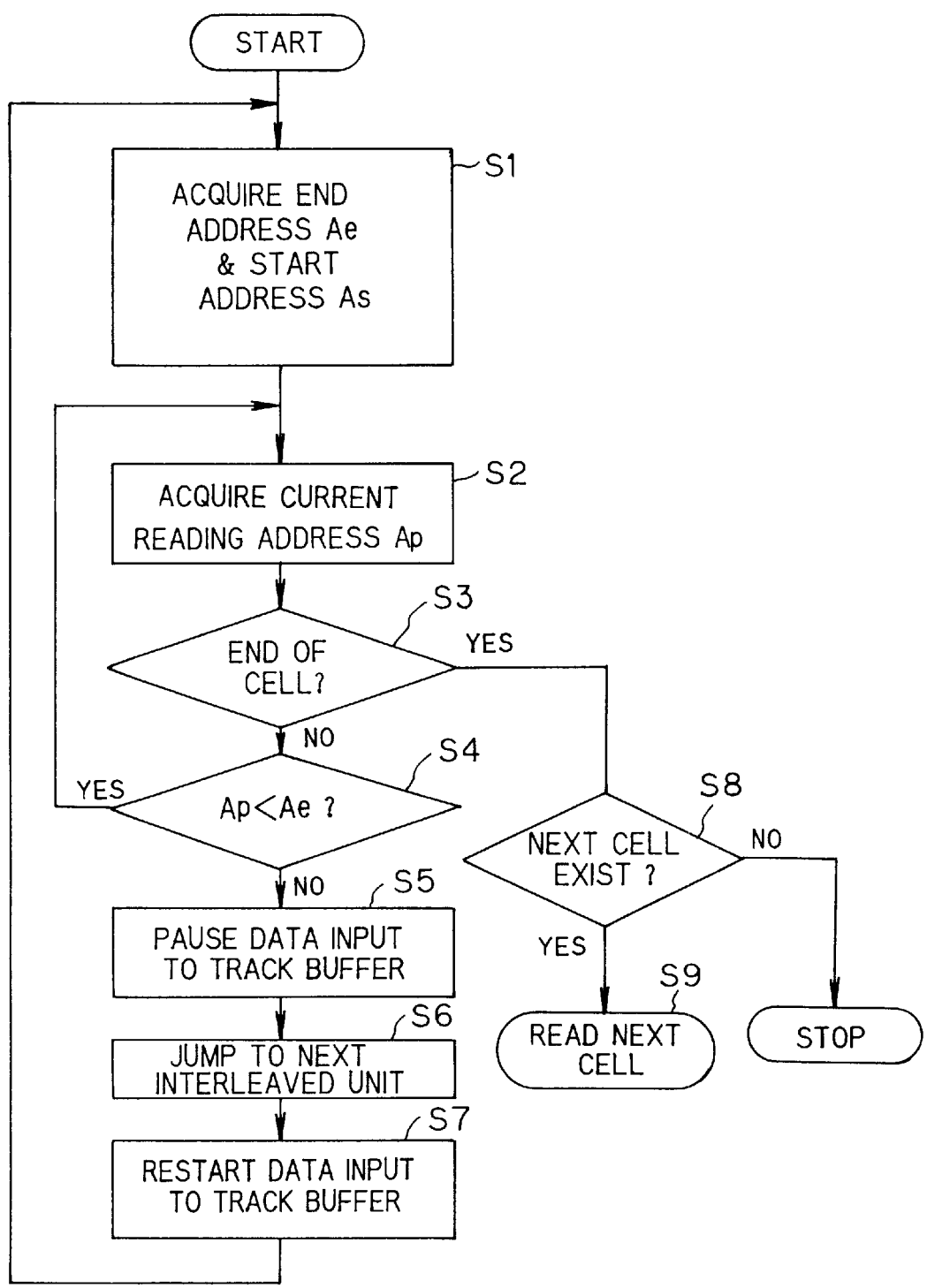
FIG. 11 is a flowchart showing an operation of reproducing interleaved units.

FIG. 11 is a flowchart illustrating the reproduction method in this case. First, when the pickup 80 reaches the cell 20 which is constituted by the interleaved units IU, the system controller 100 acquires the interleaved unit end address Ae and the start address As of the next interleaved unit IU from the DSI data in the navi-pack 41 (Step Si). Then, the system controller 100 acquires the current reading address Ap (step S2), and judges whether or not the current reading address is equal to the end of the cell 20 (step S3). If it is not the erd of the cell 20, the system controller 100 judges whether or not the end address Ae is larger than the current reading address Ap (step S4), and, if YES, returns to step S2. Namely, by steps S2 to S4, the reading of the recorded data is continued until the current reading address Ap reaches the end of the cell 20 or the end address Ae of the present interleaved unit IU. If it is judged that the current reading address Ap reaches the end of the cell 20 (step S3:YES), it is judged whether or not there exists a next cell 20 (step S8). If YES, the next cell 20 is reproduced in the same manner (step S9). If it is judged that the current reading address reaches the end of the interleaved unit IU (step S4:NO), the system controller 100 pauses the data input to the track buffer 83 (step S5), jumps to the start address As of the next interleaved unit IU (step S6) and restarts the data inputs to the track buffer 83 (step S7). By repeating these steps, the interleaved units IU may be reproduced in the seamless manner. Although one interleaved unit IU is constituted by one cell 20 in the above example, the interleaved unit IU may be constituted by plural cells 20. In that case, the border of the cells 20 may be positioned at the head of the interleaved unit IU or the middle of the interleaved unit IU.

(2) Reproduction Method in Search Operation

Next, the reproduction in the search operation will be described below. First, the types of the search operation instructed by a user will be described. There are two types of search operations, a part of title search and a time search, in the search operation performed during the reproduction of the title.

The part of title (hereinafter referred to as "PTT") recorded on the DVD 1 is identified by the PGC number and the program number as described above. In the PTT search, when a user inputs the number of the PTT via the input unit 98, the system controller 100 obtains the PGC number and the program number from the inputted PTT number. Then, the system controller 100 obtains the corresponding PGCI and recognizes the address of the head cell 20 in the PTT (program). Then, the system controller 100 searches for the head address (i.e., the pickup 80 jumps to the address) to restart the reproduction.

On the other hand, the time search is performed using a time search map which is recorded in the DVD 1. On the time search map, the head addresses of the VOBUs 30 at every unit time are recorded. When a user inputs a search target time via the input unit 98, the system controller 100 obtains the time address which is prior to and closest to the search target time, and starts the search operation, i.e., jumping to the address. In the navi-pack 41 recorded in the VOBU 30 of the search target, the addresses of some VOBUs 30 before and after the search target VOBU 30 are recorded by the unit of 0.5 second, and the system controller 100 further makes more precise search on the shorter time basis using those addresses before restarting the reproduction. In both search methods, the search operation is performed on the VOBU 30 basis. It is noted that, in the following description, the jump operation of the pickup 80 for reproducing the interleaved units will be simply referred to as "jump" and the jump operation for the search operation or the angle change operation (described later) will be referred to as "search jump" and "angle change jump", respectively.

Next, the reproduction methods in the search operation will be described. The search operation may take place in the following four different cases:

CASE 1: Search to the area which does not constitute the interleaved unit,

CASE 2: Search to the head of the interleaved unit,

CASE 3: Search to the middle of the interleaved unit, and

CASE 4: Search to the position immediately prior to the interleaved unit.

Therefore, different controls should be performed in each case for an appropriate search operation. This is because, the data accumulation state of the track buffer 83 varies dependently upon the position of the search target address in the VOBU 30 and hence an appropriate operation should be made in order to avoid the data underflow in the track buffer 83. The controls performed in each case will be described below.

CASE 1: Search to the area which does not constitute the interleaved unit

In this case, insofar as the condition that the input bit rate Rin of the track buffer 83 is larger than the output bit rate Rout thereof is satisfied, the data may be read out from the track buffer 83 immediately after the track jump.

Figure 12:
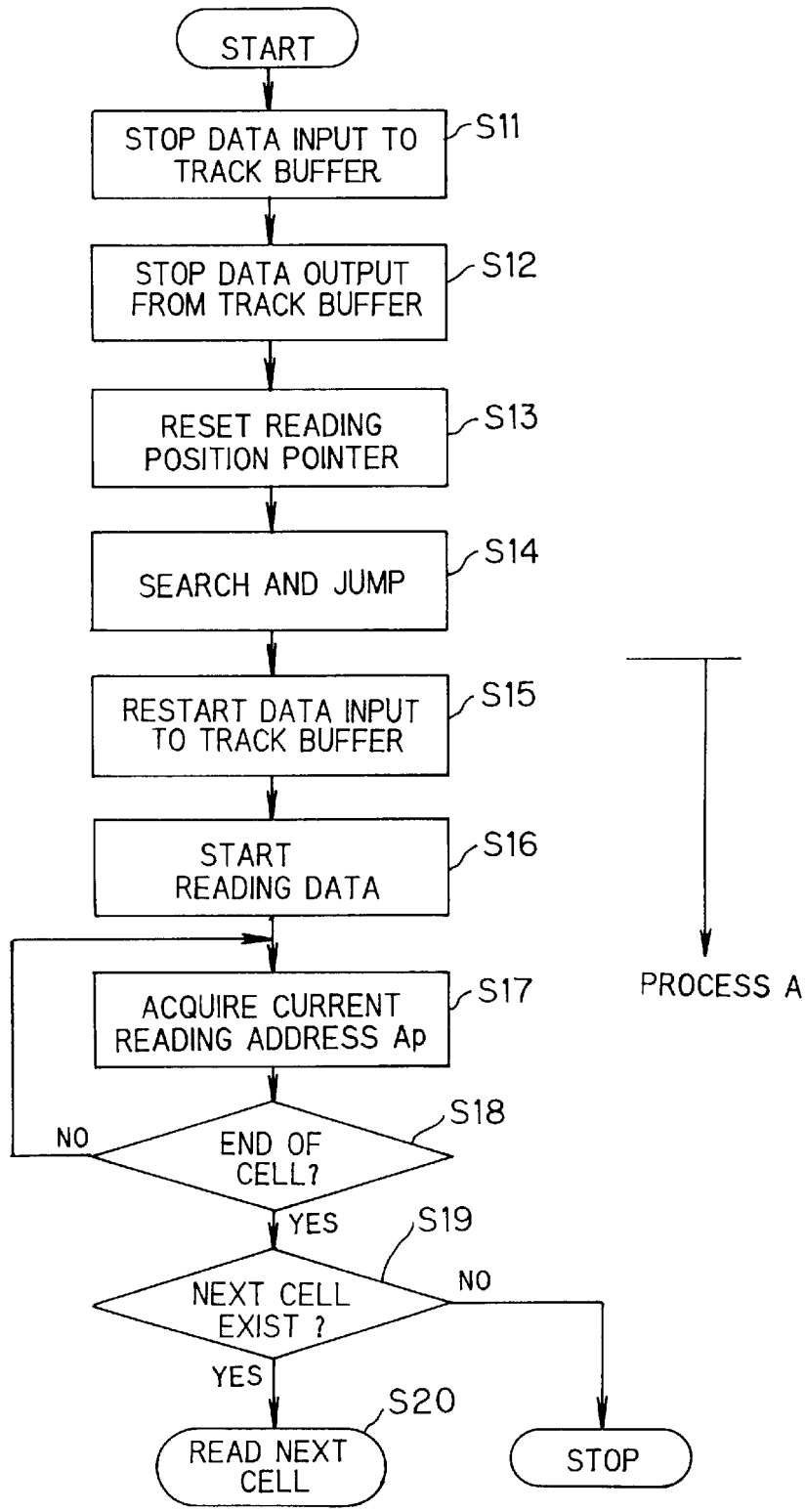
FIG. 12 is a flowchart showing a search operation.

FIG. 12 is a flowchart illustrating the operation in this case. In FIG. 12, when the search command is inputted by a user, the system controller 100 controls the stream switch 82 to stop the data input to the track buffer 83 (step S1), and then controls the stream switch 84 to stop the data output from the track buffer 83 (step S12). Then, the system controller 100 resets the pointer indicating the current reading position by the pickup 80 (step S13), and searches for the target address to make the search jump to there (step S14). After the search jump to the target address, the system controller 100 restarts the data input to the track buffer 83 (step S15), starts reading the data at the VOBU 30 (step S16) and acquires the current reading address Ap (step S17). Then, the system controller 100 judges whether or not the current reading address Ap thus acquired reaches the end of the cell 20 (step S18), and, if YES, judges whether or not there exists a next cell 20 (step S19). If the next cell exists (step S19:YES), the system controller 100 executes the reproduction of the next cell in the same manner (step S20). If the next cell does not exist (step S19:NO), the process ends. In this way, the search operation is performed.

Figure 13A:
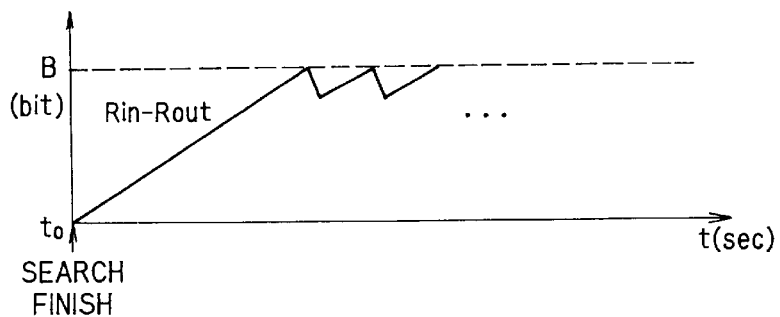
FIGS. 13A to 13D are diagrams illustrating transitions of data amount in the track buffer in search operations of various cases.

FIG. 13A shows the transition of the data amount in the track buffer 83 after the search operation, i.e., after the search jump to the target position. Since the pointer of the reading position has been reset, the track buffer 83 becomes just empty at the time when the search operation is finished (time t0). Thereafter, the data in the track buffer 83 begins to increase at the rate of (Rin−Rout). Although the track buffer 83 becomes full in a while, the system controller 100 repeatedly pauses the data input to the track buffer 83 temporarily to avoid the data overflow, as described above, until a certain amount of data is outputted. In this way, the seamless reproduction is achieved.

CASE 2: Search to the head of the interleaved unit

Figure 14:
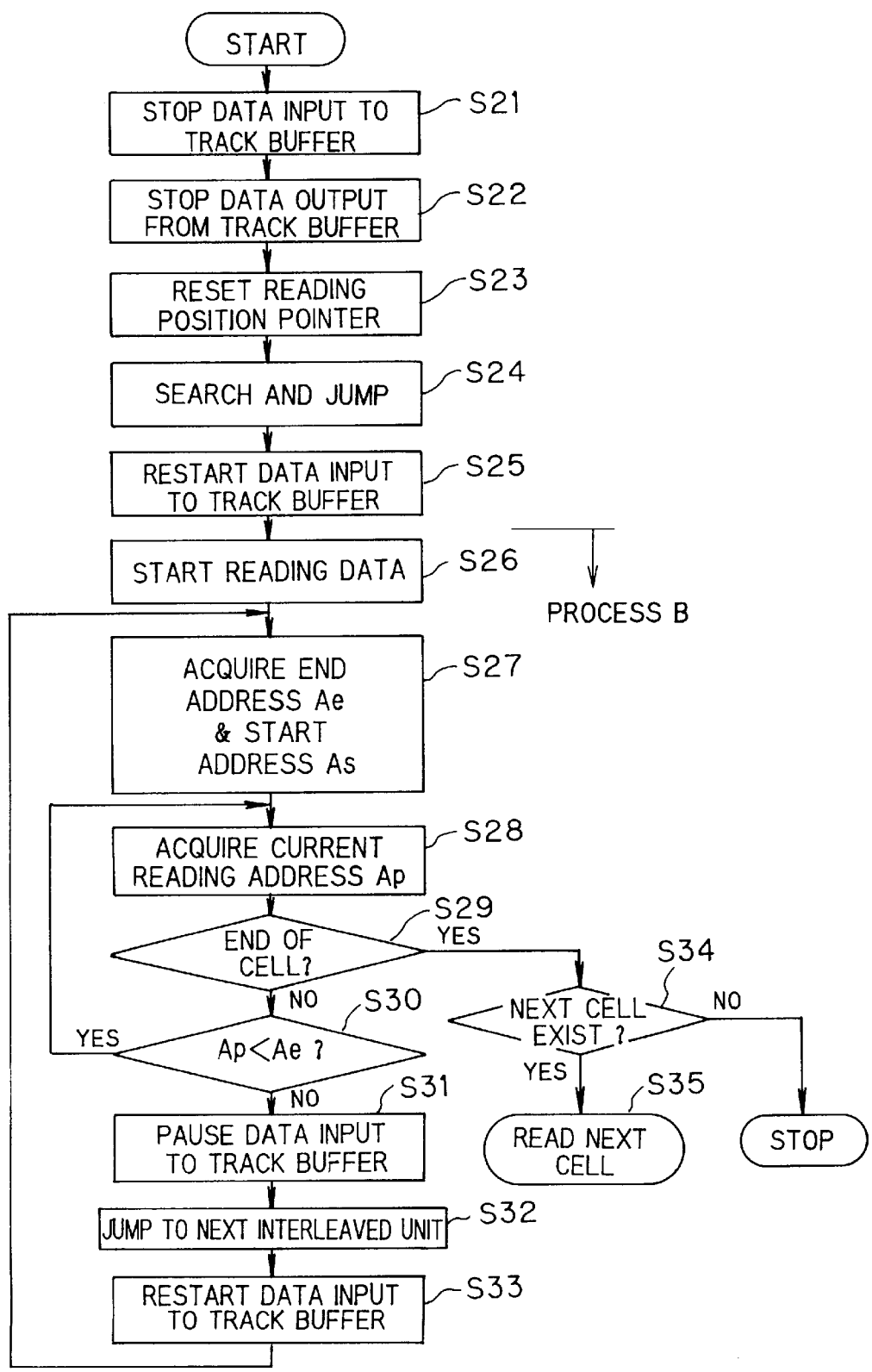
FIGS. 14 to 17 are flowcharts showing reproduction operations at the time of the search operations in various cases.

In this case, insofar as the conditions (1) and (2) described above are satisfied, the track buffer 83 does not cause underflow. FIG. 14 is a flowchart illustrating the operation in this case. In FIG. 14, steps S21 to S26 are the same as steps S11 to S16 in FIG. 12. Namely, the pickup 80 makes the search jump to the target address in response to the search instruction by the user, and then starts reading data from the head of the interleaved unit which is the target point of the search. Specifically, the end address Ae of the present interleaved unit and the start address As of the next interleaved unit are read out, and the reproduction is continued until the pickup 80 reaches the end of the cell or the end of the interleaved unit. When reaching the end of the interleaved unit, the pickup 80 jumps to the next interleaved unit. When reaching the end of the cell, the pickup 80 reproduces the next cell 20. Although this operation is executed in steps S27 to S35, the detailed description thereof will be omitted because they are the same as steps S1 to S9 of FIG. 11.

Figure 13B:
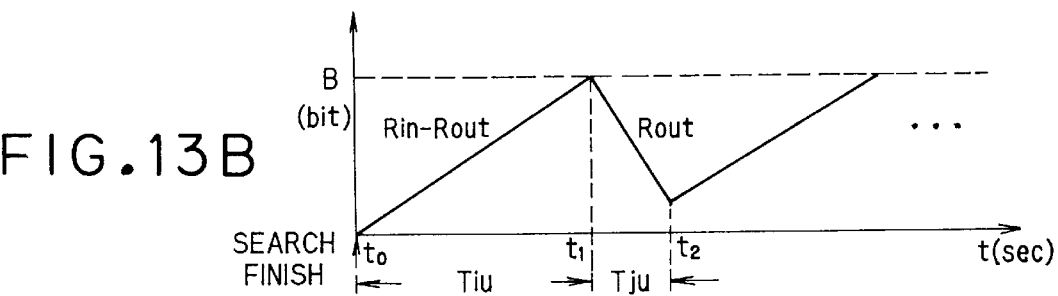

FIG. 13B shows the transition of the data amount in the track buffer 83 on the assumption that the reading time period is: Tiu=B/(Rin−Rout). As shown, the data is accumulated in the track buffer 83 at the rate of (Rin−Rout) after the search operation, and the track buffer 83 becomes full before the timing t1 of the next jump. Although the data in the track buffer 83 decreases at the rate of Rout during the jump time period Tju, the data accumulation in the track buffer 83 begins at the rate of (Rin−Rout) after the end (time t2) of the jumping time period Tju. Therefore, the seamless reproduction can be achieved without underflow.

CASE 3: Search to the middle of the interleaved unit

Figure 13C:
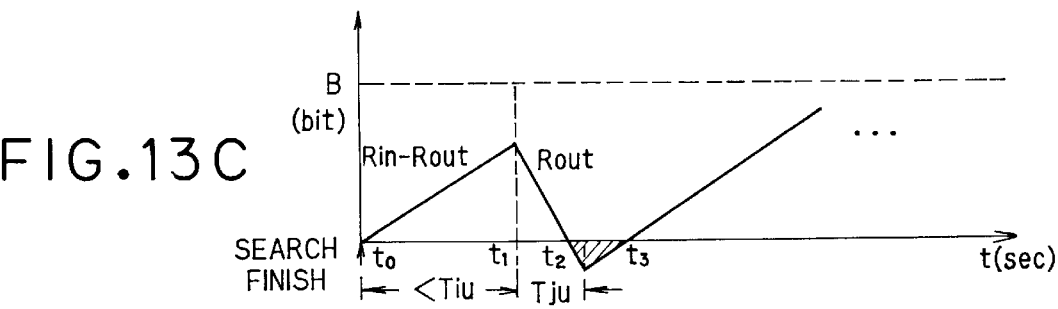

In the above-mentioned CASEs 1 and 2, the track buffer 83 becomes full during the reproduction of the interleaved unit from its head position to its end position, insofar as the aforementioned conditions (1) and (2) are satisfied. However, if the target point of the search operation is in the middle of the interleaved unit, there may be a case, if the distance from the target position to the end of the interleaved unit is short, that the pickup 80 must jump to the next interleaved unit before the track buffer 83 becomes full. FIG. 13C shows the transition of the data amount in the track buffer 83 in such a case. In FIG. 13C, the track buffer 83 is empty when the search operation is finished, and then the data in the track buffer 83 gradually increases at the rate of (Rin−Rout) up to the end of the interleaved unit. However, since the position arrived by the search jump is in the middle of the interleaved unit, the pickup 80 reaches the end of the interleaved unit before the track buffer 83 becomes full and must jump to the next interleaved unit at the time t1. Since the track buffer 83 is not full at the jump time t1, the track buffer outputs all data accumulated therein and becomes empty (at time t2) before the jump is finished, i.e., during the jumping time period Tju, thereby causing the data underflow (see. the hatched portion in FIG. 13C). Due to the underflow, the seamless reproduction cannot be achieved.

Figure 13D:
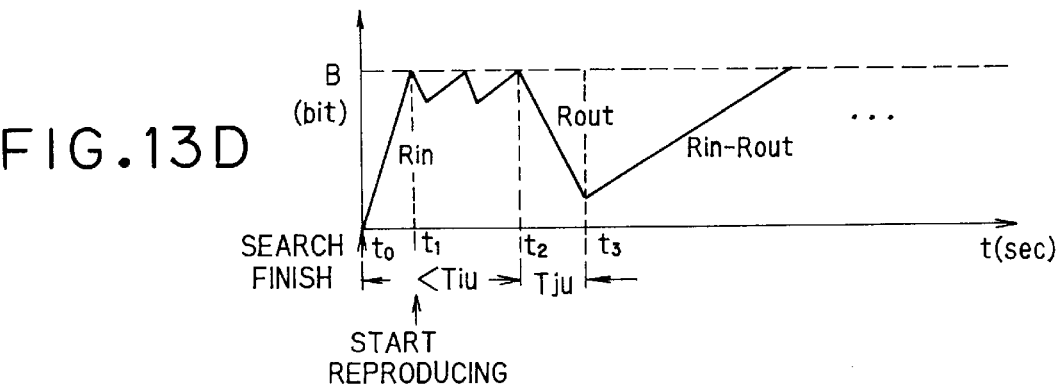

As a countermeasure to overcome such a problem, there is a technique in which the reproduction from the target position reached by the search jump is postponed until the track buffer 83 becomes full. Namely, the system controller 100 does not start the reproduction until the track buffer becomes full, after the search operation. FIG. 13D shows the transition of the data amount in the track buffer 83 by this technique. In FIG. 13D, since the track buffer 83 does not start outputting the data immediately at the time t0 when the search jump is finished, tie data is accumulated in the track buffer 83 at the rate of Rin until it becomes full at the time t1. When the track buffer 83 becomes full at the time t1, it starts outputting the data. By this, the underflow of the data can be avoided. If the timing of next track jump arrives before the track buffer 83 becomes full, the system controller 100 pauses the data input to the track buffer 83, makes jump and then restarts the data input to the track buffer 83. Also in this case, the data output is postponed until the track buffer 83 becomes full.

Figure 15:
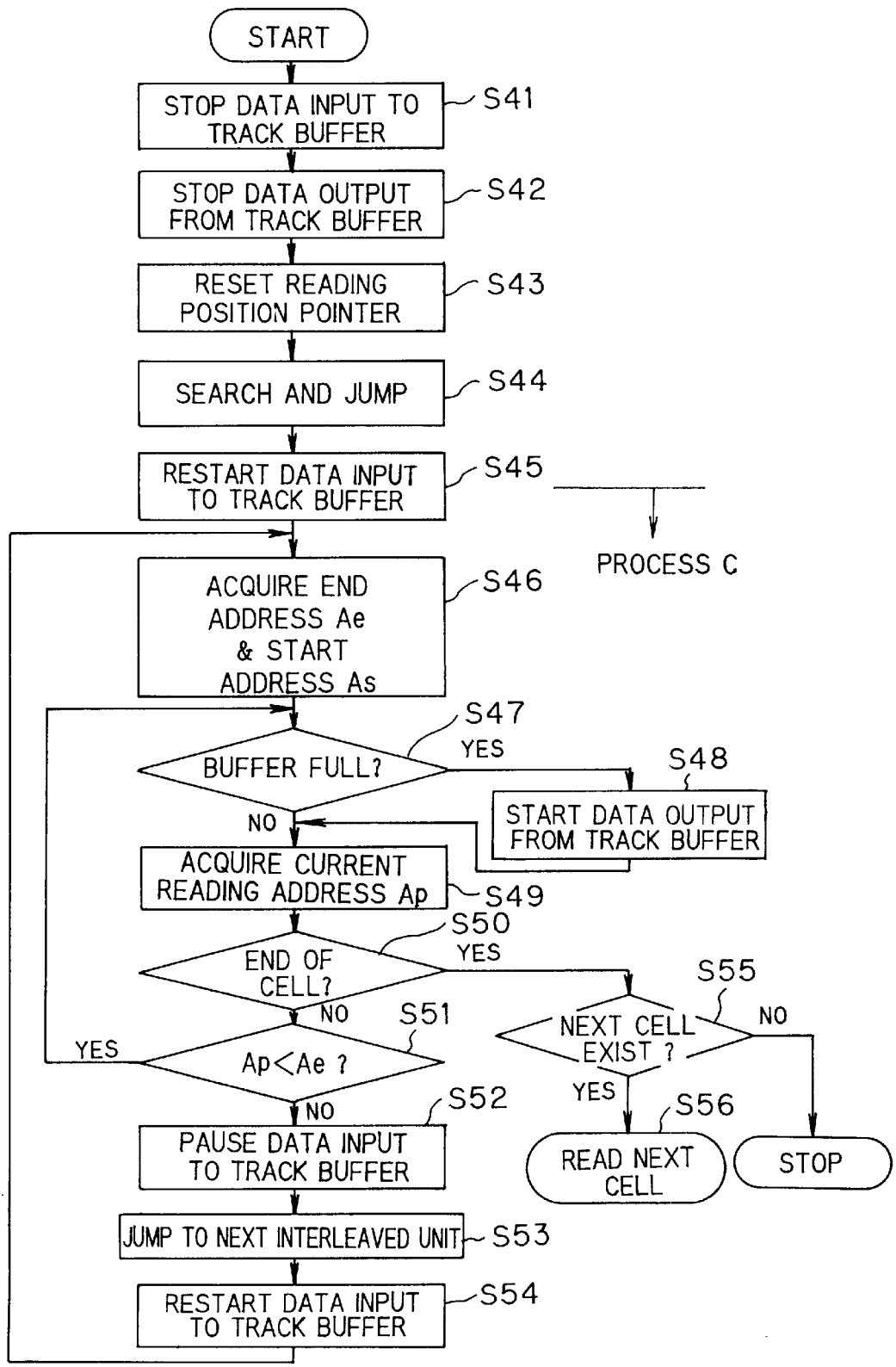

FIG. 15 is a flowchart illustrating the reproduction method described above, that is, for the case where the search jump to the middle of the interleaved unit is performed. When the user inputs the search command, the system controller 100 stops the data input to the track buffer 83, performs the search jump, and restarts the data input to the track buffer 83 to accumulate the data therein (steps S41 to S45). However, at this timing, the data output from the track buffer 83 is still kept stopped. Then, the system controller 100 acquires the end address Ae of the interleaved unit and the start address of the next interleaved unit As (step S46), and judges whether or not the track buffer becomes full (step S47). If the track buffer becomes full, the system controller 100 starts the data output from the track buffer 83 (step S48). If the track buffer 83 is not full yet, the system controller 100 acquires the current reading address Ap (step S49), and continues the reading until the current reading address Ap reaches the end of the cell or the end of the interleaved unit (Steps S50 and S51). If the current reading address Ap reaches the end of the cell, then the system controller 100 reproduces the next cell (step S55). On the other hand, if the current reading address Ap reaches the end of the interleaved unit, the pickup 80 jumps to the next interleaved unit (steps S652 to S54). It is noted that steps S41 to S45 are the same as steps Sll to S15 of FIG. 12, and the steps S46 to S56 are the same as steps S1 to S9 of FIG. 11 except for steps S47 and S48 being added. In this way, the seamless reproduction can be achieved, although the start of the reproduction after the search operation is delayed for some time.

CASE 4: Search to the position immediately prior to the interleaved unit

Also in this case, there may be a case where the jump timing to the next interleaved unit arrives soon after the finish of the search jump, and the seamless reproduction can not be performed. Therefore, in this CASE 4, the reproduction of the data after the search operation is postponed until the track buffer 83 becomes full.

Figure 16:
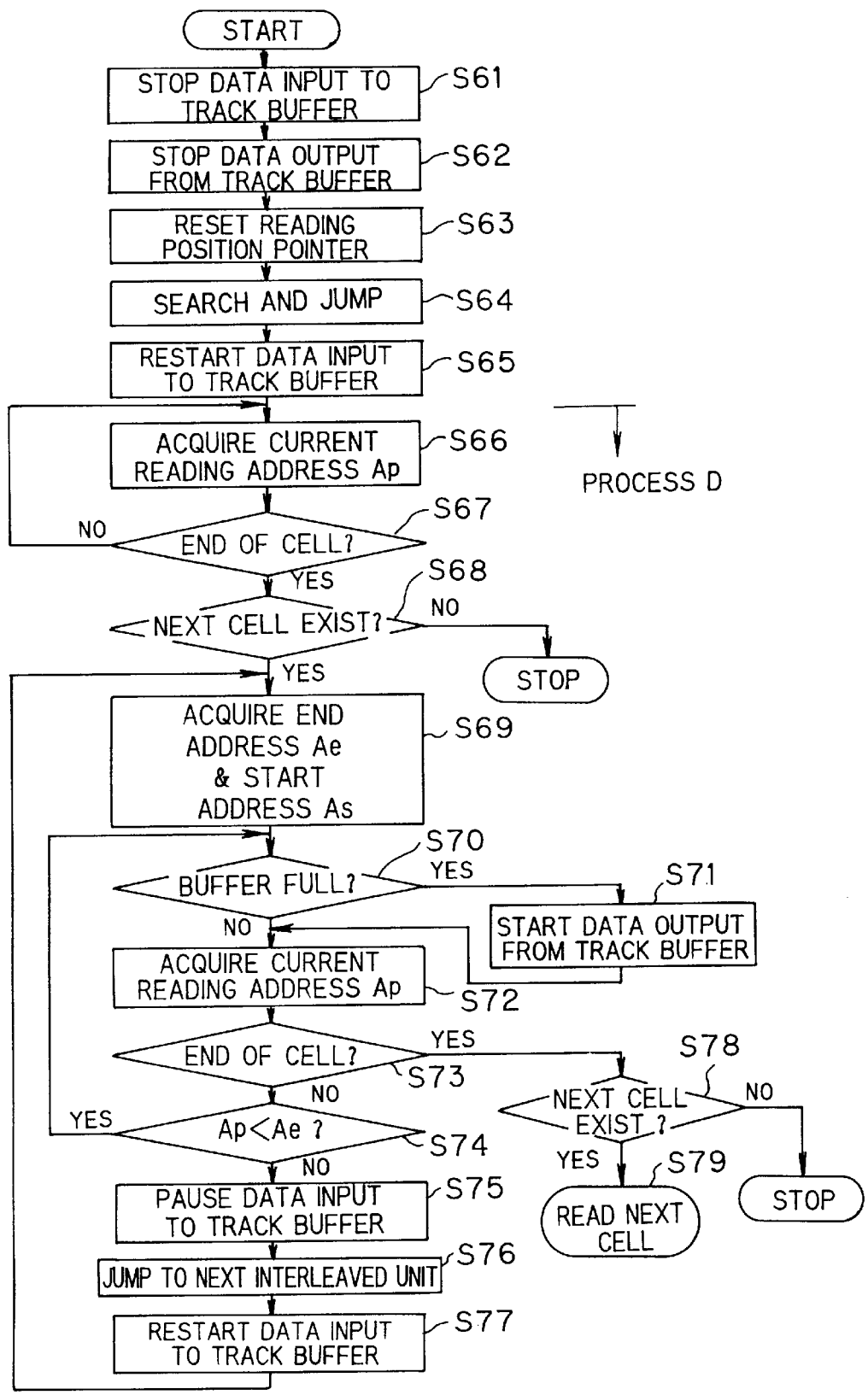

FIG. 16 is a flowchart illustrating the search operation to just prior to the interleaved unit. In this case, the process same as steps S41 to S45 of FIG. 15 is performed (steps S61 to S65), and the pickup 80 enters the interleaved unit after the process of steps S66 to S68. Thereafter, the process same as steps S46 to S56 of FIG. 15 is performed (steps S69 to S79).

As described above, there may be four cases, CASE 1 to CASE 4, in which the search operation takes place, and the seamless reproduction is ensured in the CASEs 1 and 2 without problem. On the other hand, in the CASEs 3 and 4, in addition to the aforementioned methods in which the reproduction is postponed until the track buffer 83 becomes full, there may be another method in which the reproduction is immediately started like the CASEs 1 and 2, although the data underflow may take place. According to the methods described in the CASEs 3 and 4, the underflow is avoided, however, the start of the reproduction after the search operation is delayed. Concretely, the total required time T from the input of the search command by the user to the start of the reproduction of the pictures at the search target position (i.e., after the search jump) is:

T=(jumping time period Tj)+(time required for the track buffer to become full).

Assuming that the data input rate Rin=11 Mbps, the capacity of the track buffer B=3 Mbit, and the jumping time period Tj=0.25 second, the total time T is:

$$T=0.25+3/11=0.52 \text{ second},$$

and the total time for search operation becomes twice or more of the time required for the jump operation. Therefore, if the method in which the data in the track buffer 83 is read out immediately after the search operation is applied to all the CASEs 1 to 4, the underflow may occur, although the total search time T is reduced. On the other hand, if the method in which the reproduction of the data is postponed until the track buffer 83 becomes full is applied to all of the CASEs 1 to 4, the total search time always becomes long, although the underflow can be avoided and seamless reproduction can be achieved.

In view of this, in the present invention, information as to which CASE the target cell of the search operation is classified is recorded in the cell table 20a in each cell 20 or the DSI data 51 in the VOBU 30 as the interleave information. The system controller 100 reads this information first, and then determines the reproduction method.

Figure 17:
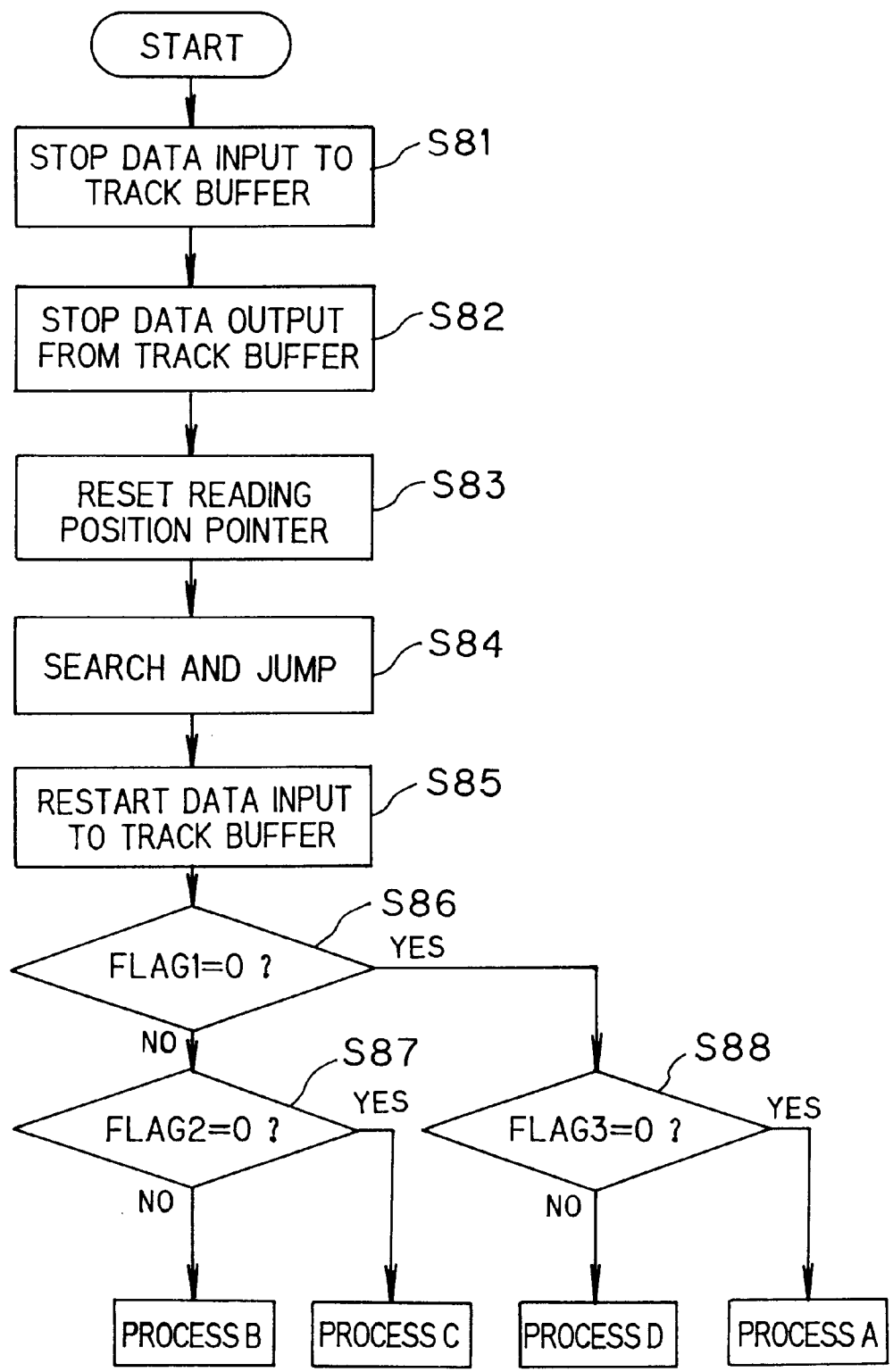

FIG. 17 is a flowchart illustrating this method. When the user inputs the search command, the system controller 100 stops the data input and the data output to and from the track buffer 83, performs the search jump, and then restarts the data input to the track buffer 83 to accumulate the data in the track buffer (steps S81 to S85). Then, the system controller 100 checks the interleave flag (steps S86 to S88). If both of the interleave flag 1 and the interleave flag 3 are "0", it corresponds to the CASE 1, and hence the system controller 100 carries out the process A (steps S16 to S20) shown in FIG. 12. If the interleave flag 1 is "0" and the interleave flag 3 is "1", it corresponds to the CASE 4, and hence the system controller 100 carries out the process D shown in FIG. 16 (steps S66 to S79). If the interleave flag 1 is "1" and the interleave flag 2 is "0", it corresponds to the CASE 3, and hence the system controller 100 carries out the process C shown in FIG. 15 (steps S46 to S56). If both of the interleave flag 1 and the interleave flag 2 are "1", it corresponds to the CASE 2, and hence the system controller 100 carries out the process B shown in FIG. 14 (steps S26 to S35).

With this treatment, in the case of search operation to the cell which does not constitute interleaved unit (and further the target position is not immediately before the interleaved unit), or in the case of search to the head of the interleaved unit, the data output from the track buffer is started immediately after the finish of the search operation and hence the time delay of the reproduction may be minimized. On the other hand, in the case of search to the middle of the interleaved unit or to the position just before the interleaved unit, the reproduction is postponed until the track buffer 83 becomes full, and hence the underflow of the tack buffer 83 may be prevented.

As described above, the interleave information may be recorded in the cell table 20a in the cell, or in the DSI data 51 in the VOBU 30. If the interleave information is recorded in the cell table 20a, the time delay of the reproduction from the search instruction may be surely reduced in the PTT search. However, in the case of time search, there may be a case where the interleave information can not be read because the target position of the time search is not always the head of the cell 20. In such a case, the reproduction may be postponed until the track buffer becomes full. On the other hand, if the interleave information is recorded in the DSI data 51 on the VOBU 30, the time delay may be surely reduced in both PTT search and the time search because the interleave information in the VOBU 30 can be acquired after the search operation.

(3) Reproduction Method at the Time of Angle Change

Next, the reproduction method at the time of the angle change will be described. The angle reproduction is a reproduction method in which multiple pictures for a unique scene taken from different views are recorded, and the reproducing apparatus reproduces one of them according to the user's selection. The angle change is to change the selection of the angle.

Figure 18A:
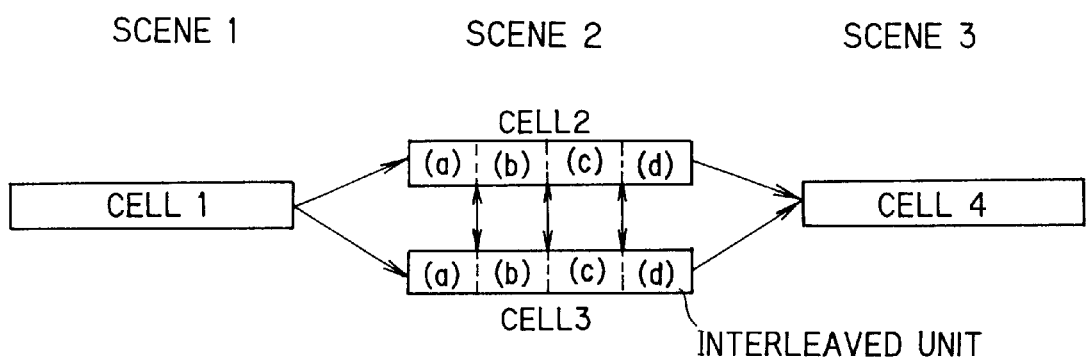
FIGS. 18A and 18B are diagrams illustrating an operation of the angle change.
Figure 18B:
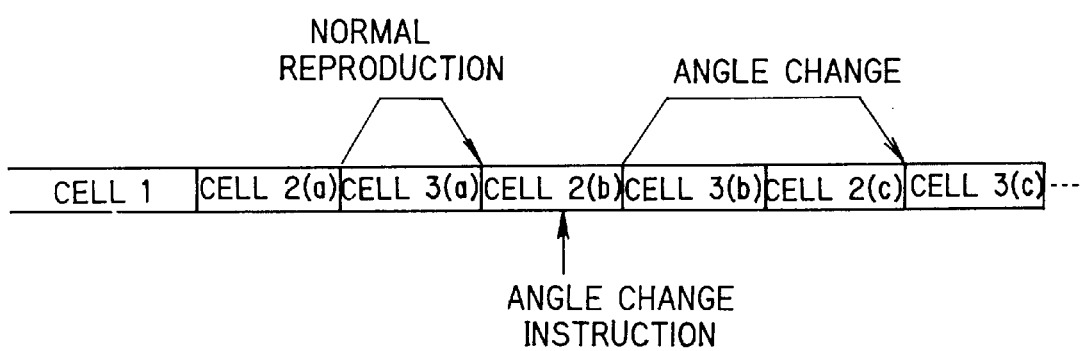

FIG. 18A shows an example of the angle change. As shown, at the scene 2 following the scene 1, there are prepared multiple pictures taken from different camera angles and they are recorded in the cell 2 and the cell 3, respectively. The user can select one of the cells 2 and 3 at the scene 2 to be reproduced. In this case, the jump operation is performed in the manner shown in FIG. 18B. Namely, assuming that the user has selected the angle of cell 2 at the scene 2, the system controller 100 reproduces the cell 1 and cell 2(a), and then jumps to the next cell 2(b). Here, if the user inputs a command for changing the angle (angle change instruction), the system controller 100 reproduces the cell 2(b) to the end thereof, and jumps to the cell 3(c) and reproduces it. In this way, the angle change is performed. The angle change instruction is inputted to the reproducing apparatus S2 via the input unit 98, such as a remote controller or the like, by the user.

In order to perform the angle change in a seamless manner, the jump should be made after the track buffer 83 becomes full. Therefore, the jump start position should be the end of the interleaved unit and the jump end position should be the head of the interleaved unit. Further, it is required that that the aforementioned conditions (1) and (2) are satisfied for all jump operations. The jump target address at the time of the angle change is recorded in the respective navi-packs 41.

Figure 19:
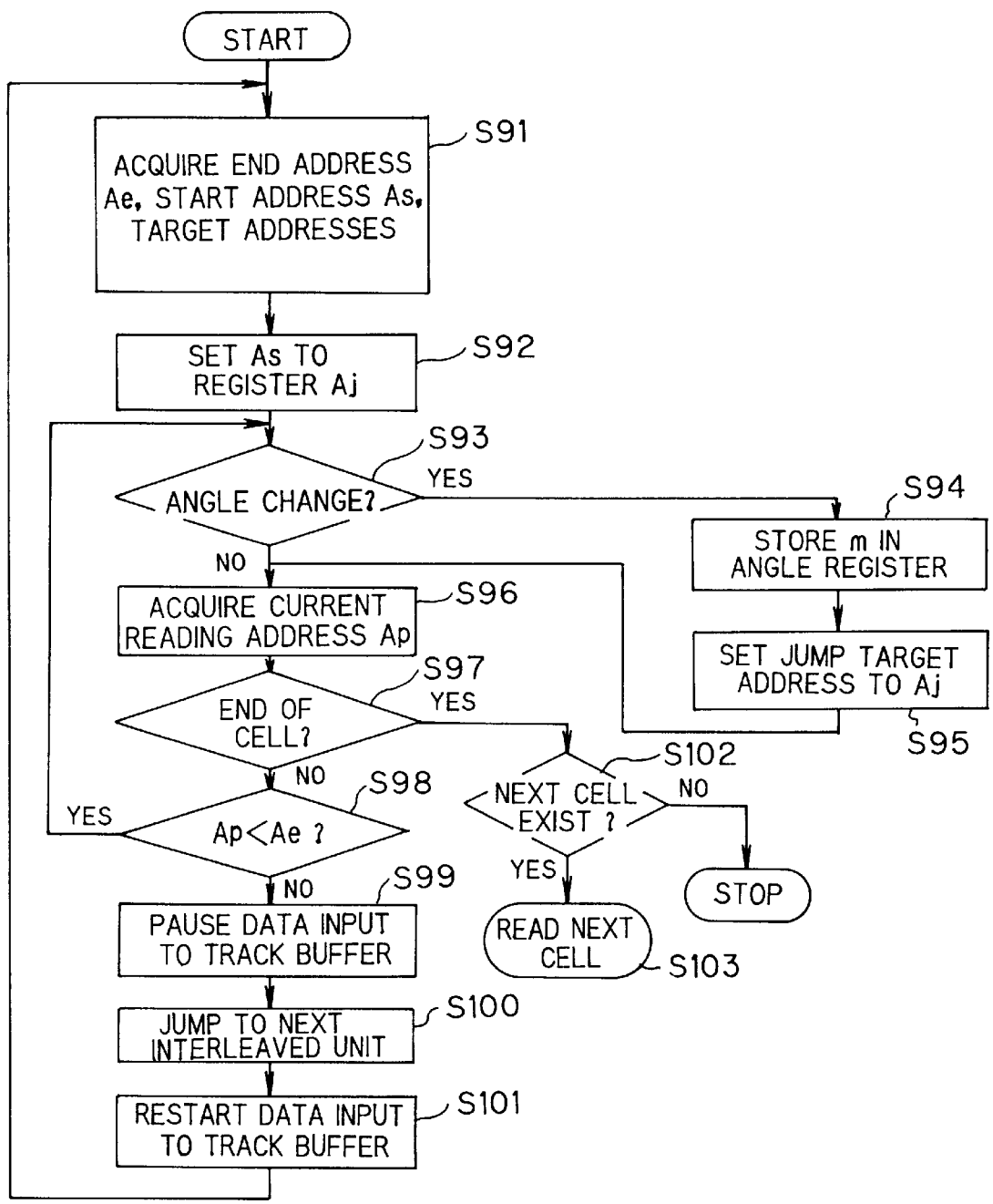
FIG. 19 is a flowchart showing a reproduction operation at the time of the angle change.

FIG. 19 is a flowchart illustrating the operation of the seamless reproduction at the time of the angle change. First, in the normal reproduction, the system controller 100 acquires the end address Ae of the interleaved unit, the start address As of the next interleaved unit, and all jump target addresses (step S91), and sets the start address As to the jump target address register Aj (step S92). Then, the system controller 100 judges whether or not the angle change instruction is inputted (step S93). If it is not inputted, the system controller 100 acquires the current reading address Ap (step S96), and continues the reproduction until the pickup 80 reaches the end of the cell or the end of the interleaved unit. If the pickup 80 reaches the end of the cell or the interleaved unit, the pickup jumps to the next interleaved unit (steps S98 to S101). If the pickup 80 reaches the end of the cell, the next cell is reproduced (steps S102 to S103). On the other hand, if the angle change instruction is detected in step S93, the angle m after the change is stored in the angle register Aa in the system controller 100 (step S94) and the next jump target address in the changed angle m is set to the jump target address register Aj (step S95). By this, the pickup 80 jumps to the head of the next interleaved unit belonging to the changed angle m in step S100.

Figure 20A:
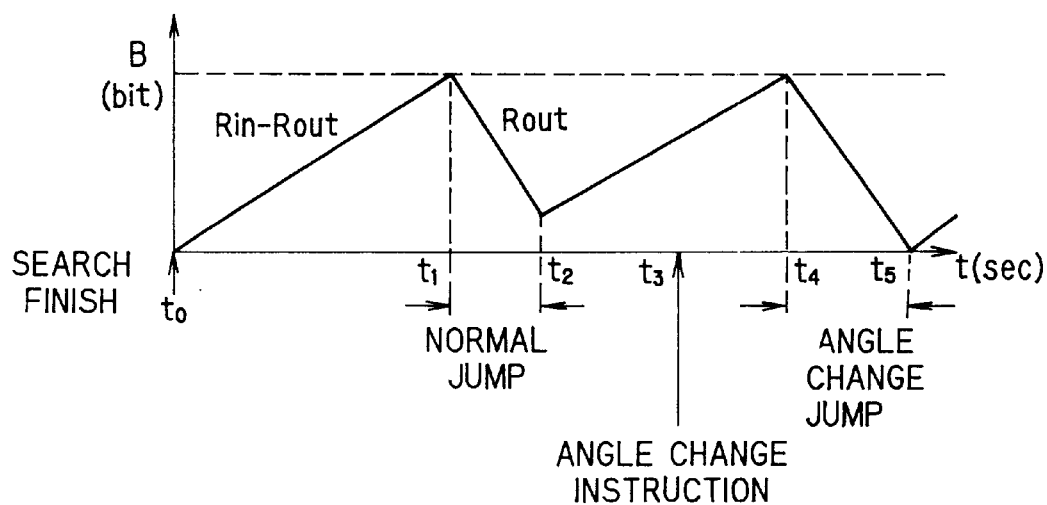
FIGS. 20A and 20B are diagrams illustrating transitions of data amount in the track buffer at the time of the angle change.

FIG. 20A shows the transition of the data amount in the track buffer during the operation described above. When the search operation ends at the time t0, the data is accumulated in the track buffer 83 at the rate of (Rin−Rout) until the time t1. At the time 1, a normal jump operation is performed, and the reproduction of the next interleaved unit starts at the time t2. If the angle change instruction is inputted at the time t3, the data is accumulated in the track buffer 83 until the time t4, and then the angle change jump is carried out. After the time t5, the reproduction is performed for the changed angle.

As can be understood from the above description, the start position of the angle change jump must be the end of the interleaved unit in order to perform seamless reproduction. Therefore, the system controller 100 should wait for a time period corresponding to the reproduction time of one interleaved unit at the maximum before making the angle change jump. Assuming that the capacity B of the track buffer 83 is 3 Mbit, the data input rate Rin=11 Mbps, and the data output rate Rout, it takes 3/(11−8)=1.0 second to actually start the angle change jump. However, in some cases, the user does not wish the seamless reproduction if the angle change operation takes relatively long time. For example, in the case of the camera angle change in a sports game program, it may be desired that the angle is rapidly changed in response to the angle change instruction even if the picture may be stopped for a while, i.e., the reproduction becomes non-seamless. Indeed, the user sometimes feels that such a non-seamless reproduction is more natural and comfortable compared with the case that the angle change takes relatively long time period.

Figure 21:
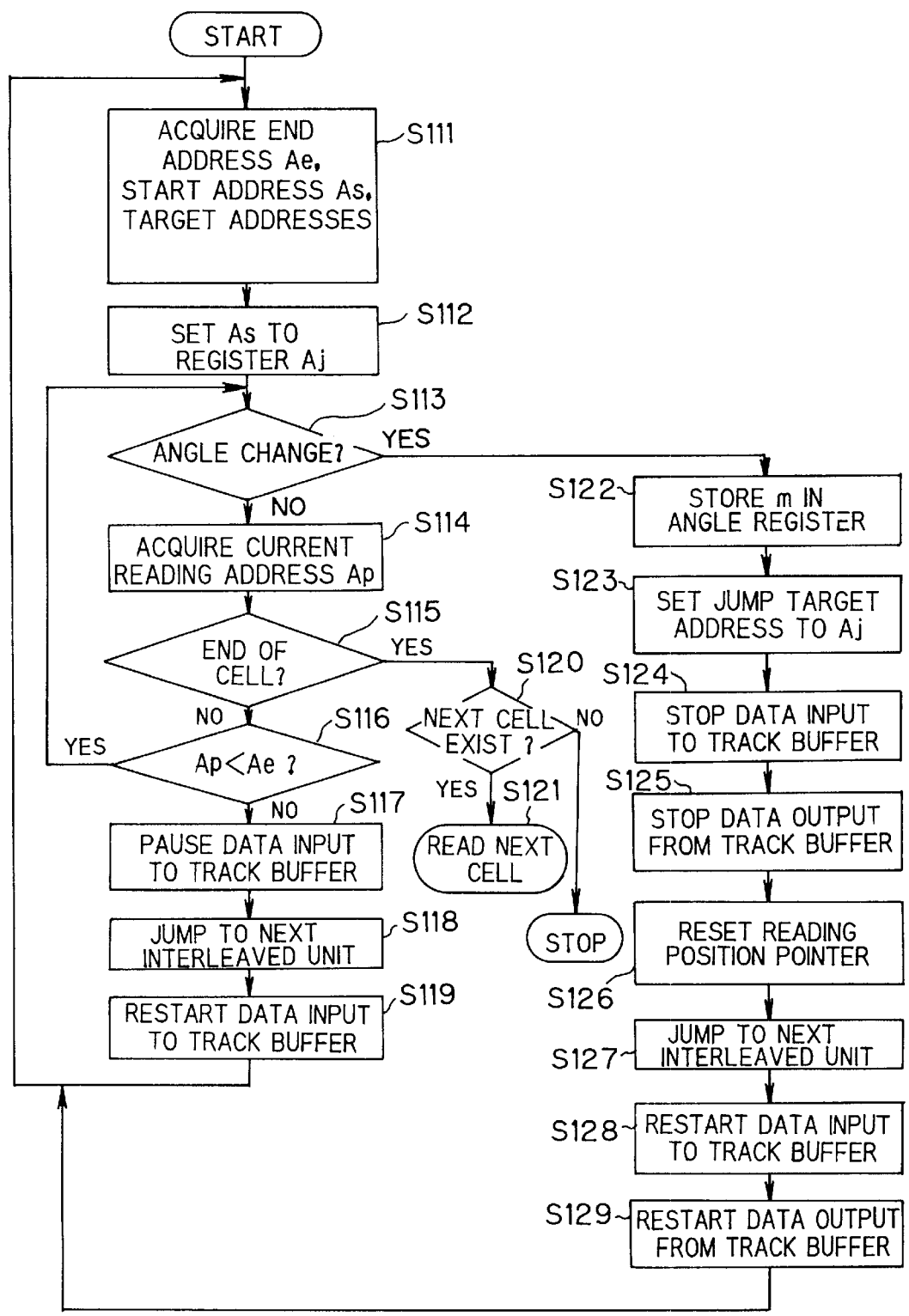
FIGS. 21 and 22 are flowcharts showing reproduction operations at the time of the angle change.

For this reason, there is a method of non-seamless reproduction at the time of angle change. Namely, instead of the seamless reproduction, the angle change is quickly made in response to the user's angle change instruction. FIG. 21 shows the reproduction operation of this method. In FIG. 21, steps S111 to S121 are the same as steps S91 to S101 in FIG. 19, and therefore the description will be omitted. In this reproduction method, when the angle change instruction is detected in step S113, the angle m after the change is stored in the angle register Aa of the system controller 100 (step S122), and the jump target address according to the changed angle m is set to the jump target address register Aj (step S123). By this, the jump target address becomes the head address of the next interleaved unit belonging to the angle m after the change. Thereafter, the data input and the data output are stopped (steps S124 and S125) to immediately make the angle change jump. Then, the track buffer pointer is reset (step S126) and the pickup 80 jumps to the target address Aj (step S127). When the angle change jump is finished, the data input to the track buffer 83 is restarted (step S128), and the data output from the track buffer 83 is restarted (step S129). In this manner, the angle change jump is immediately performed after the angle change instruction from the user.

Figure 20B:
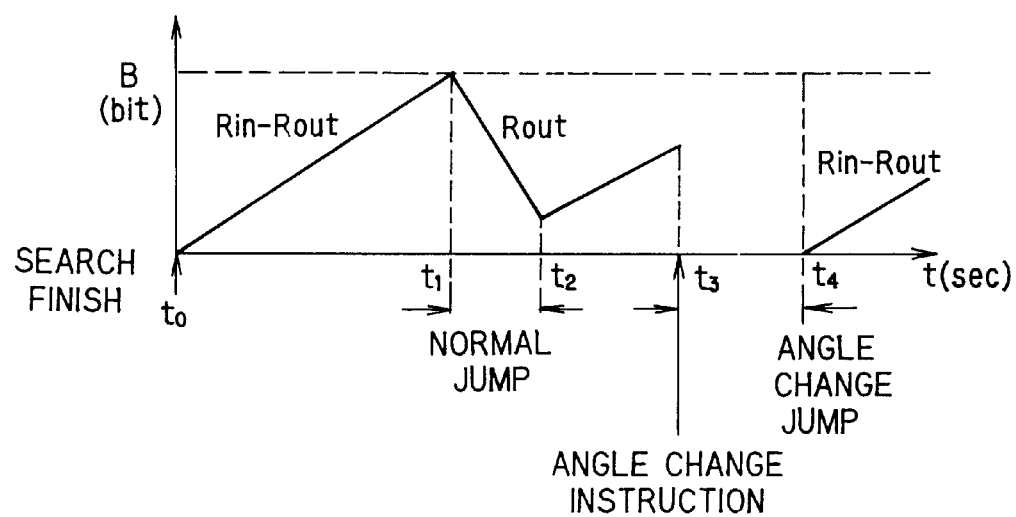

FIG. 20B shows the transition of the data amount in the track buffer 83 during the above described operation. Before the angle change instruction is inputted at the time t3, the transition of the data amount is the same as the case of FIG. 20A. When the angle change instruction is inputted, the system controller 100 immediately resets the track buffer pointer and makes the angle change jump. During the angle change jump, i.e., from time t3 to t4, the picture just before the input of the angle change instruction is continuously displayed. When the angle change jump is finished at the time t4, the data is reproduced from the head of the interleaved unit of the jump target position.

As described above, there are two reproduction methods at the time of angle change. One method reproduces the pictures seamlessly, however, the start of the reproduction is delayed. The other method reproduces the pictures immediately after the angle change instruction from the user, however, the reproduction is non-seamless. It is preferable that the author or the producer can determine as to which method should be selected in consideration of the contents of the title recorded on the DVD 1. Therefore, as described above, the angle change flag AP, designating one of the above-mentioned two methods, is recorded in the cell table 20a in the cell 20 as the angle change information. In reproduction, the system controller 100 determines one of the reproduction method by referring to the angle change information thus recorded.

Figure 22:
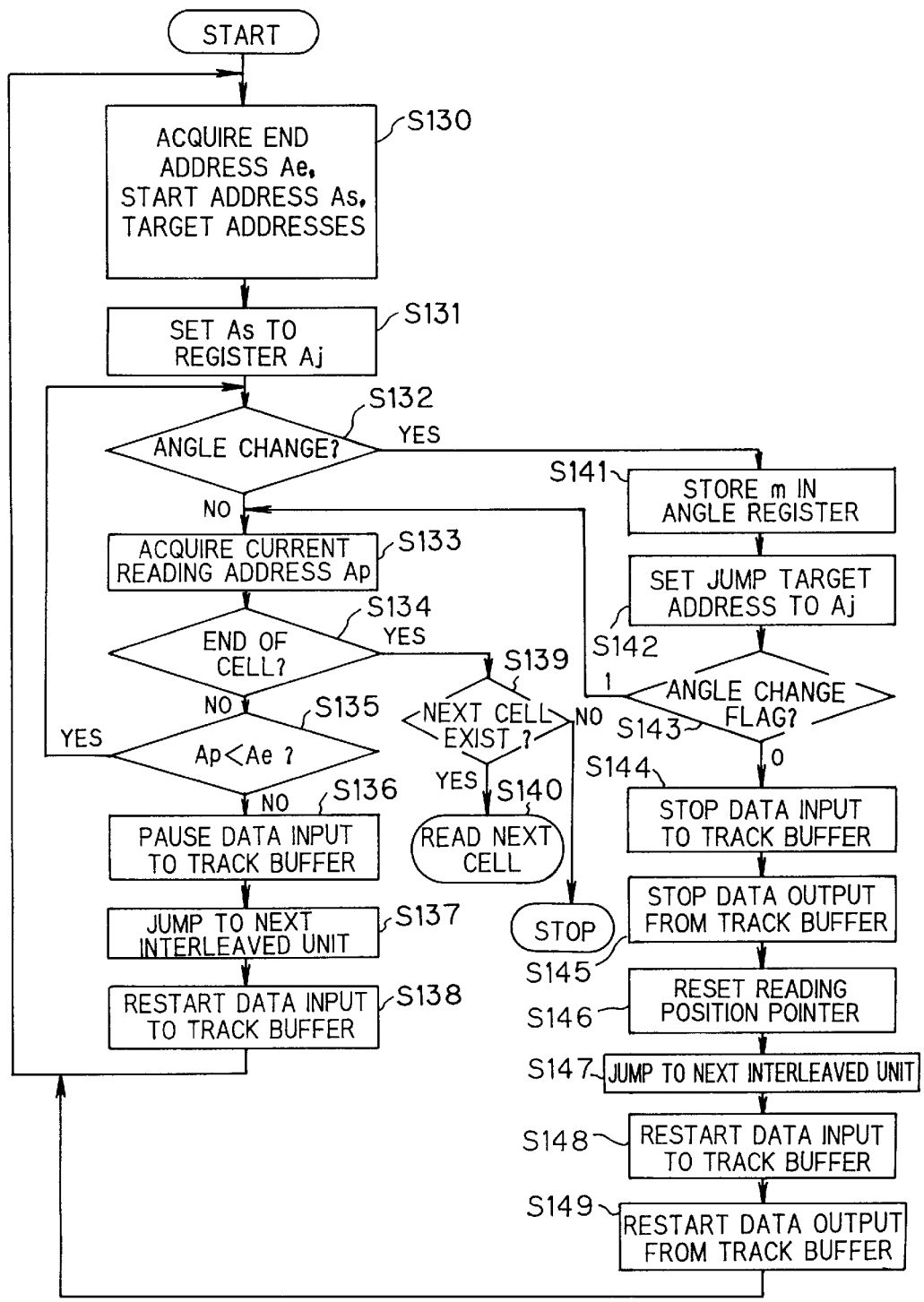

FIG. 22 is a flowchart showing this operation. In FIG. 22, the process of steps S130 to S139 and steps S141 to S142 are the same as the process of steps S91 to S103 and steps S94 to S95 in FIG. 19, and the process of steps S144 to S149 is the same as the process of steps S123 to S129. Namely, in step S143, the system controller 100 refers to the angle change flag recorded in the cell table 20a. If the angle change flag is "1", the process goes to step S133 to perform the seamless reproduction. If the angle change flag is "0", the process goes to step S144 to immediately make the angle change jump and restart the reproduction in the non-seamless manner.

As described above, by prescribing the angle change information, the author or the producer can determine the appropriate reproduction method at the time of angle change, i.e., one of the seamless reproduction method which involves time delay and the non-seamless reproduction method which is immediately started in response to the user's instruction. Therefore, the freedom of design in producing the DVD software may be improved.

What is claimed is:

1. An information recording medium reproduced by an information reproducing apparatus having a reproduction unit and a reproduction control unit for controlling the reproduction unit for jumping to a jump target position and continuing reproduction, the recording medium comprising:

a plurality of cells reproduced successively by the reproduction unit;

a plurality of interleaved units successively positioned on the information recording medium, wherein each of the plurality of cells includes at least one interleaved unit;

a plurality of video block units (VOB units) including navigation information, wherein each of the plurality of interleaved units includes at least one video block unit;

at least one data search information packet (DSI packet) included in the navigation information and related to a reproduction order of the interleaved units;

at least one program chain information (PGCI) related to a reproduction order of the cells, wherein at least one of the data search information packet and the program chain information includes a jump reproduction method selection information piece indicating one of a plurality of jump reproduction methods performed by the reproduction unit.

2. An information recording medium reproduced by an information reproducing apparatus having a reproduction unit and a reproduction control unit for controlling the reproduction unit for jumping to a jump target position and continuing reproduction, the recording medium comprising:

a plurality of first information pieces reproduced successively by the reproduction unit;

a plurality of second information pieces positioned successively on the information recording medium, wherein each of the first information pieces includes at least one second information piece;

a plurality of third information pieces including navigation information, wherein each of the second information pieces includes at least one third information piece;

at least one related information piece included in the navigation information and related to a reproduction order of the second information pieces;

at least one reproduction control information piece that relates to a reproduction order of the first information pieces, wherein at least one of the at least one related information piece and the at least one reproduction control information piece includes a jump reproduction method selection information piece indicating one of a plurality of jump reproduction methods performed by the reproduction unit.

3. The medium according to claim 2, wherein the navigation information is positioned at a beginning portion of each of the plurality of third information pieces.

4. The medium according to claim 2, wherein the plurality of jump reproduction methods includes a first method in which the reproduction unit jumps to the jump target position immediately after an instruction is provided by a user, and a second method in which the reproduction unit jumps to the jump target position after a completion of reproduction of the second information piece being reproduced when the instruction is provided by the user.

5. The medium according to claim 2, wherein the jump reproduction method selection information piece is determined in accordance with the jump target position in a selected jump reproduction method.

6. The medium according to claim 2, wherein the plurality of first information pieces includes a plurality of selectable information pieces, one of the selectable information pieces being reproduced selectively at a reproduction time period in the reproduction order.

7. The medium according to claim 6, wherein the jump reproduction method selection information piece is determined in accordance with a selected jump reproduction method of the plurality of selectable information pieces.

8. An information recording medium reproduced by an information reproducing apparatus having a reproduction unit and a reproduction control unit for controlling the reproduction unit for jumping to a jump target position and continuing reproduction, the recording medium comprising:

a plurality of first information pieces reproduced successively by the reproduction unit;

a plurality of second information pieces successively positioned on the information recording medium, wherein each of the plurality of first information pieces includes at least one second information piece;

a plurality of third information pieces including navigation information, wherein each of the plurality of second information pieces includes at least one third information piece;

at least one related information piece included in the navigation information and related to a reproduction order of the plurality of second information pieces;

a first reproduction control information piece referred by the reproduction unit and identifying a reproduction order of the plurality of first information pieces, wherein at least one of the related information pieces and the first reproduction control information pieces includes a jump reproduction method selection information piece indicating one of a plurality of jump reproduction methods performed by the jump reproduction unit; and a second reproduction control information piece referred to by the reproduction unit and that identifies a reproduction order of the plurality of first information pieces, wherein the reproduction order identified by the first reproduction control information piece includes at least one first information piece which is the same as at least one first information piece included in the reproduction order referred by the second reproduction control information piece.

9. The medium according to claim 8, wherein the navigation information is positioned at a beginning portion of each of the plurality of third information pieces.

10. The medium according to claim 8, wherein the plurality of jump reproduction methods include a first method in which the reproduction unit jumps to the jump target position immediately after an instruction is provided by a user, and a second method in which the reproduction unit jumps to the jump target position after a completion of reproduction of the second information piece being reproduced when the instruction is provided by the user.

11. The medium according to claim 8, wherein the jump reproduction method selection information piece is determined in accordance with the jump target position in a selected jump reproduction method.

12. The medium according to claim 8, wherein the plurality of first information pieces includes a plurality of selectable information pieces, one of the selectable information pieces being reproduced selectively at a reproduction time period in the reproduction order.

13. The medium according to claim 12, wherein the jump reproduction method selection information piece is determined in accordance with a selected jump reproduction method of the plurality of selectable information pieces.

14. An information recording apparatus comprising:

a first unit for dividing information having continuous contents into a plurality of independently reproducible third information pieces;

a second unit for producing at least one related information piece related to a reproduction order of second information pieces, each of the second information pieces including at least one of the plurality of third information pieces;

a third unit for producing a first reproduction control information piece identifying a reproduction order of first information pieces each including at least one of the second information pieces, and for producing a second reproduction control information piece identifying a reproduction order of the first information pieces, wherein the reproduction order identified by the first reproduction control information piece includes at least one first information piece which is the same as at least one first information piece included in the reproduction order identified by the second reproduction control information pieces;

a fourth unit for producing at least one jump reproduction method selection information piece indicating one of a plurality of jump reproduction methods; and a recording unit for recording the third information pieces, the at least one related information piece, the reproduction control information pieces and the at least one jump reproduction method selection information piece on an information recording medium.

15. An information reproducing apparatus for reproducing information from an information recording medium, the information recording medium comprising:

a plurality of first information pieces;

a plurality of second information pieces successively positioned on the information recording medium, one or more of the second information pieces constituting the first information piece;

a plurality of third infonmation pieces including navigation information, one or more of the third information pieces constituting the second information pieces;

at least one related infonmation piece included in the navigation information and related to a reproduction order of the second information pieces;

at least one reproduction control information piece that relates to a reproduction order of the plurality of first information pieces, wherein at least one of the related information pieces and the reproduction control information pieces includes a jump reproduction method selection information piece indicating one of a plurality of jump reproduction methods;

the information recording apparatus comprising:

a reproduction unit for successively reproducing the second information pieces in order to reproduce the first information pieces by referring to the related information pieces; and a reproduction control unit for controlling the reproduction unit to jump to a jump target position in accordance with the jump reproduction method specified by the jump reproduction method selection information piece.

16. The apparatus according to claim 15, wherein the jump reproduction unit controls the reproduction unit by one of a first method in which the reproduction unit reproduces the first, second and third information pieces in a seamless manner, and a second method in which the reproduction unit reproduces the first, second and third information pieces in a non-seamless manner.

17. The apparatus according to claim 16, wherein the reproduction unit further comprises:

a reading unit for reading the first, second and third information pieces;

a storing unit for storing the first, second and third information pieces read by the reading unit; and an outputting unit for outputting the first, second and third information pieces stored in the storing unit, wherein the outputting unit begins outputting the first, second and third information pieces immediately after the reproducing unit jumps to the jump target position in the first method and begins outputting the first, second and third information pieces when the storing unit becomes full after the jump of the reproducing unit in the second method.

18. An information reproducing apparatus for reproducing information from an information recording medium comprising:

a plurality of first information pieces;

a plurality of second information pieces successively positioned on the information recording medium, one or more of the plurality of second information pieces constituting the first information piece;

a plurality of third information pieces including navigation information, one or more of the plurality of third information pieces constituting each of the plurality of second information pieces;

at least one related information piece included in the navigation information and related to a reproduction order of the second information pieces;

a first reproduction control information piece identifying a reproduction order of the plurality of first information pieces;

a second reproduction control information piece identifying a reproduction order of the plurality of first information pieces, wherein the reproduction order identified by the first reproduction control information piece includes at least one first information piece which is the same as at least one first information piece included in the reproduction order identified by the second reproduction control information piece; and a jump reproduction method selection information piece indicating one of a plurality of jump reproduction methods performed by the jump reproduction unit, the information reproducing apparatus comprising:

a reproduction unit for successively reproducing the second information pieces to reproduce the plurality of first information pieces by referring to the at least one related information piece; and a reproduction control unit for controlling the reproduction unit to jump to a jump target position in accordance with the jump reproduction method specified by the jump reproduction method selection information piece.

19. The apparatus according to claim 18, wherein the jump reproduction unit controls the reproduction unit by one of a first method in which the reproduction unit reproduces the information pieces in a seamless manner and a second method in which the reproduction unit reproduces the information pieces in a non-seamless manner.

20. The apparatus according to claim 18, wherein the reproduction unit further comprises:

a reading unit for reading data representing the first, second and third information pieces;

a storing unit for storing the data read by the reading unit; and an outputting unit for outputting the data stored in the storing unit, wherein the outputting unit begins outputting the data immediately after the reproducing unit jumps to the jump target position in the first method and begins outputting the data when the storing unit becomes full after the jump of the reproducing unit in the second method.

* * * * *

UNITED STATES PATENT AND TRADEMARK OFFICE
CERTIFICATE OF CORRECTION

PATENT NO. : 5,966,352
DATED : October 12, 1999
INVENTOR(S) : Akihiro TOZAKI, et al.

It is certified that error appears in the above-identified patent and that said Letters Patent is hereby corrected as shown below:

Title page, item [75], inventors, should read as following:

--Akihiro TOZAKI, Tsurugashima-shi, Ryuichiro

YOSHIMURA, Tokorozawa-shi, Takao SAWABE, Meguro-ku,

Yoshiaki MORIYAMA, Tsurugashima-shi, Junichi YOSHIO,

Tokorozawa-shi, all of Japan--.

Column 27, Line 43 change "ajump" to --a jump--.

Signed and Sealed this

Tenth Day of April, 2001

Attest:

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO.     : 5,966,352
DATED          : October 12, 1999
INVENTOR(S)    : Akihiro Tozaki et al.

It is certified that error appears in the above-identified patent and that said Letters Patent is hereby corrected as shown below:

Title page,
Item [75], should read -- [75]  Inventors Akihiro Tozaki, Tsurugashima-shi, Ryuichiro Yoshimura, Tokorozawa-shi, Takao Sawabe, Meguro-ku, Yoshiaki Moriyama, Tsurugashima-shi, Kaoru Yamamoto, Tsurugashima-shi, Junichi Yoshio, Tokorozawa-shi, all of Japan --.

Column 29,
Lines 6 and 9, delete "infonmation" and insert -- information --.
Line 21, delete "recording" and insert -- reproducing --.
Lines 31-32, delete "the jump reproduction unit" and insert -- the reproduction control unit --.
Lines 49 and 52, delete "reproducing" and insert -- reproduction --.

Column 30,
Line 26, delete "the jump" and insert -- a --.
Lines 37-38, delete "the jump reproduction unit" and insert -- the reproduction control unit --.
Lines 51 and 54, delete "reproducing" and insert -- reproduction --.

Signed and Sealed this

Fifteenth Day of April, 2003

JAMES E. ROGAN
*Director of the United States Patent and Trademark Office*